(12) United States Patent
Paul et al.

(10) Patent No.: US 9,178,923 B2
(45) Date of Patent: Nov. 3, 2015

(54) SYSTEMS AND METHODS FOR REMOTELY CONTROLLING A MEDIA SERVER VIA A NETWORK

(75) Inventors: John Paul, Palo Alto, CA (US); Myles Cagney, Novato, CA (US); Peter Mark Hennessy, Novato, CA (US)

(73) Assignee: EchoStar Technologies L.L.C., Englewood, CO (US)

( * ) Notice: Subject to any disclaimer, the term of this patent is extended or adjusted under 35 U.S.C. 154(b) by 601 days.

(21) Appl. No.: 12/645,870

(22) Filed: Dec. 23, 2009

(65) Prior Publication Data
US 2011/0150432 A1 Jun. 23, 2011

(51) Int. Cl.
| H04N 9/80 | (2006.01) |
| H04N 5/765 | (2006.01) |
| H04L 29/06 | (2006.01) |

(52) U.S. Cl.
CPC ........ *H04L 65/4084* (2013.01); *H04L 65/4092* (2013.01); *H04L 65/602* (2013.01)

(58) Field of Classification Search
None
See application file for complete search history.

(56) References Cited

U.S. PATENT DOCUMENTS

| 3,416,043 A | 12/1968 | Jorgensen |
| 4,254,303 A | 3/1981 | Takizawa |
| 5,161,021 A | 11/1992 | Tsai |
| 5,237,648 A | 8/1993 | Mills et al. |
| 5,386,493 A | 1/1995 | Degen et al. |
| 5,434,590 A | 7/1995 | Dinwiddie, Jr. et al. |
| 5,493,638 A | 2/1996 | Hooper et al. |
| 5,602,589 A | 2/1997 | Vishwanath et al. |
| 5,661,516 A | 8/1997 | Carles |
| 5,666,426 A | 9/1997 | Helms |
| 5,682,195 A | 10/1997 | Hendricks et al. |
| 5,706,290 A | 1/1998 | Shaw et al. |
| 5,708,961 A | 1/1998 | Hylton et al. |
| 5,710,605 A | 1/1998 | Nelson |
| 5,722,041 A | 2/1998 | Freadman |
| 5,757,416 A | 5/1998 | Birch et al. |
| 5,774,170 A | 6/1998 | Hite et al. |
| 5,778,077 A | 7/1998 | Davidson |

(Continued)

FOREIGN PATENT DOCUMENTS

| CN | 1981496 A | 11/1927 |
| CN | 1464685 | 12/2003 |

(Continued)

OTHER PUBLICATIONS

European Patent Office, European Search Report for European Application No. EP 08 16 7880, mailed Mar. 4, 2009.

(Continued)

*Primary Examiner* — Heather Jones
(74) *Attorney, Agent, or Firm* — Ingrassia Fisher & Lorenz, P.C.

(57) ABSTRACT

Systems and methods are described for remotely controlling a personal or digital video recorder (PVR/DVR), a set top box (STB), a placeshifting device, or any other media server. A communications session is established between a server host and the media server in response to a connection request received from the client. Information about the content processed at the media server is received via the session and provided to the client. In response to subsequent instructions received from the client, the media server can be controlled, or other actions can be taken, by providing directions to the media server from the host via the communications session. Additional or alternate features may be provided as desired.

20 Claims, 4 Drawing Sheets

(56) References Cited

U.S. PATENT DOCUMENTS

| | | | |
|---|---|---|---|
| 5,794,116 A | 8/1998 | Matsuda et al. |
| 5,822,537 A | 10/1998 | Katseff et al. |
| 5,831,664 A | 11/1998 | Wharton et al. |
| 5,850,482 A | 12/1998 | Meany et al. |
| 5,852,437 A | 12/1998 | Wugofski et al. |
| 5,880,721 A | 3/1999 | Yen |
| 5,898,679 A | 4/1999 | Brederveld et al. |
| 5,909,518 A | 6/1999 | Chui |
| 5,911,582 A | 6/1999 | Redford et al. |
| 5,922,072 A | 7/1999 | Hutchinson et al. |
| 5,936,968 A | 8/1999 | Lyons |
| 5,968,132 A | 10/1999 | Tokunaga |
| 5,987,501 A | 11/1999 | Hamilton et al. |
| 6,002,450 A | 12/1999 | Darbee et al. |
| 6,008,777 A | 12/1999 | Yiu |
| 6,014,694 A | 1/2000 | Aharoni et al. |
| 6,020,880 A | 2/2000 | Naimpally |
| 6,031,940 A | 2/2000 | Chui et al. |
| 6,036,601 A | 3/2000 | Heckel |
| 6,040,829 A | 3/2000 | Croy et al. |
| 6,043,837 A | 3/2000 | Driscoll, Jr. et al. |
| 6,049,671 A | 4/2000 | Slivka et al. |
| 6,075,906 A | 6/2000 | Fenwick et al. |
| 6,088,777 A | 7/2000 | Sorber |
| 6,097,441 A | 8/2000 | Allport |
| 6,104,334 A | 8/2000 | Allport |
| 6,108,041 A | 8/2000 | Faroudja et al. |
| 6,115,420 A | 9/2000 | Wang |
| 6,117,126 A | 9/2000 | Appelbaum et al. |
| 6,141,059 A | 10/2000 | Boyce et al. |
| 6,141,447 A | 10/2000 | Linzer et al. |
| 6,160,544 A | 12/2000 | Hayashi et al. |
| 6,201,536 B1 | 3/2001 | Hendricks et al. |
| 6,212,282 B1 | 4/2001 | Mershon |
| 6,222,885 B1 | 4/2001 | Chaddha et al. |
| 6,223,211 B1 | 4/2001 | Hamilton et al. |
| 6,240,459 B1 | 5/2001 | Roberts et al. |
| 6,240,531 B1 | 5/2001 | Spilo et al. |
| 6,243,596 B1 | 6/2001 | Kikinis |
| 6,256,019 B1 | 7/2001 | Allport |
| 6,263,503 B1 | 7/2001 | Margulis |
| 6,279,029 B1 | 8/2001 | Sampat et al. |
| 6,282,714 B1 | 8/2001 | Ghori et al. |
| 6,286,142 B1 | 9/2001 | Ehreth |
| 6,310,886 B1 | 10/2001 | Barton |
| 6,317,780 B1 | 11/2001 | Cohn et al. |
| 6,340,994 B1 | 1/2002 | Margulis et al. |
| 6,353,885 B1 | 3/2002 | Herzi et al. |
| 6,356,945 B1 | 3/2002 | Shaw et al. |
| 6,357,021 B1 | 3/2002 | Kitagawa et al. |
| 6,370,688 B1 | 4/2002 | Hejna, Jr. |
| 6,389,467 B1 | 5/2002 | Eyal |
| 6,421,429 B1 | 7/2002 | Merritt et al. |
| 6,434,113 B1 | 8/2002 | Gubbi |
| 6,442,067 B1 | 8/2002 | Chawla et al. |
| 6,456,340 B1 | 9/2002 | Margulis |
| 6,466,623 B1 | 10/2002 | Youn et al. |
| 6,470,378 B1 | 10/2002 | Tracton et al. |
| 6,476,826 B1 | 11/2002 | Plotkin et al. |
| 6,487,319 B1 | 11/2002 | Chai |
| 6,493,874 B2 | 12/2002 | Humpleman |
| 6,496,122 B2 | 12/2002 | Sampsell |
| 6,505,169 B1 | 1/2003 | Bhagavath et al. |
| 6,510,177 B1 | 1/2003 | De Bonet et al. |
| 6,529,506 B1 | 3/2003 | Yamamoto et al. |
| 6,553,147 B2 | 4/2003 | Chai et al. |
| 6,557,031 B1 | 4/2003 | Mimura et al. |
| 6,564,004 B1 | 5/2003 | Kadono |
| 6,567,984 B1 | 5/2003 | Allport |
| 6,584,201 B1 | 6/2003 | Konstantinou et al. |
| 6,584,559 B1 | 6/2003 | Huh et al. |
| 6,587,125 B1 | 7/2003 | Paroz |
| 6,597,375 B1 | 7/2003 | Yawitz |
| 6,598,159 B1 | 7/2003 | McAlister et al. |
| 6,600,838 B2 | 7/2003 | Chui |
| 6,609,253 B1 | 8/2003 | Swix et al. |
| 6,611,530 B1 | 8/2003 | Apostolopoulos |
| 6,628,716 B1 | 9/2003 | Tan et al. |
| 6,642,939 B1 | 11/2003 | Vallone et al. |
| 6,647,015 B2 | 11/2003 | Malkemes et al. |
| 6,658,019 B1 | 12/2003 | Chen et al. |
| 6,665,751 B1 | 12/2003 | Chen et al. |
| 6,665,813 B1 | 12/2003 | Forsman et al. |
| 6,697,356 B1 | 2/2004 | Kretschmer et al. |
| 6,701,380 B2 | 3/2004 | Schneider et al. |
| 6,704,678 B2 | 3/2004 | Minke et al. |
| 6,704,847 B1 | 3/2004 | Six et al. |
| 6,708,231 B1 | 3/2004 | Kitagawa |
| 6,718,551 B1 | 4/2004 | Swix et al. |
| 6,732,158 B1 * | 5/2004 | Hesselink et al. ............ 709/208 |
| 6,754,266 B2 | 6/2004 | Bahl et al. |
| 6,754,439 B1 | 6/2004 | Hensley et al. |
| 6,757,851 B1 | 6/2004 | Park et al. |
| 6,757,906 B1 | 6/2004 | Look et al. |
| 6,766,376 B2 | 7/2004 | Price |
| 6,768,775 B1 | 7/2004 | Wen et al. |
| 6,771,828 B1 | 8/2004 | Malvar |
| 6,774,912 B1 | 8/2004 | Ahmed et al. |
| 6,781,601 B2 | 8/2004 | Cheung |
| 6,785,700 B2 | 8/2004 | Masud et al. |
| 6,795,638 B1 | 9/2004 | Skelley, Jr. |
| 6,798,838 B1 | 9/2004 | Ngo |
| 6,806,909 B1 | 10/2004 | Radha et al. |
| 6,807,308 B2 | 10/2004 | Chui et al. |
| 6,816,194 B2 | 11/2004 | Zhang et al. |
| 6,816,858 B1 | 11/2004 | Coden et al. |
| 6,826,242 B2 | 11/2004 | Ojard et al. |
| 6,834,123 B2 | 12/2004 | Acharya et al. |
| 6,839,079 B2 | 1/2005 | Barlow et al. |
| 6,847,468 B2 | 1/2005 | Ferriere |
| 6,850,571 B2 | 2/2005 | Tardif |
| 6,850,649 B1 | 2/2005 | Malvar |
| 6,868,083 B2 | 3/2005 | Apostolopoulos et al. |
| 6,889,385 B1 | 5/2005 | Rakib et al. |
| 6,892,359 B1 | 5/2005 | Nason et al. |
| 6,898,583 B1 | 5/2005 | Rising, III |
| 6,907,602 B2 | 6/2005 | Tsai et al. |
| 6,927,685 B2 | 8/2005 | Wathen |
| 6,930,661 B2 | 8/2005 | Uchida et al. |
| 6,941,575 B2 | 9/2005 | Allen |
| 6,944,880 B1 | 9/2005 | Allen |
| 6,952,595 B2 | 10/2005 | Ikedo et al. |
| 6,981,050 B1 | 12/2005 | Tobias et al. |
| 7,016,337 B1 | 3/2006 | Wu et al. |
| 7,020,892 B2 | 3/2006 | Levesque et al. |
| 7,032,000 B2 | 4/2006 | Tripp |
| 7,047,305 B1 | 5/2006 | Brooks et al. |
| 7,110,558 B1 | 9/2006 | Elliott |
| 7,124,366 B2 | 10/2006 | Foreman et al. |
| 7,127,507 B1 | 10/2006 | Clark et al. |
| 7,151,575 B1 | 12/2006 | Landry et al. |
| 7,155,734 B1 | 12/2006 | Shimomura et al. |
| 7,155,735 B1 | 12/2006 | Ngo et al. |
| 7,184,433 B1 | 2/2007 | Oz |
| 7,224,323 B2 | 5/2007 | Uchida et al. |
| 7,239,800 B2 | 7/2007 | Bilbrey |
| 7,260,312 B2 | 8/2007 | Srinivasan et al. |
| 7,272,300 B2 | 9/2007 | Srinivasan et al. |
| 7,344,084 B2 | 3/2008 | DaCosta |
| 7,366,403 B2 | 4/2008 | Muguruma et al. |
| 7,392,281 B1 | 6/2008 | Kanojia et al. |
| 7,430,686 B1 | 9/2008 | Wang et al. |
| 7,464,396 B2 | 12/2008 | Hejna, Jr. |
| 7,478,164 B1 | 1/2009 | Lango et al. |
| 7,478,166 B2 | 1/2009 | Agnoli et al. |
| 7,502,733 B2 | 3/2009 | Andrsen et al. |
| 7,505,480 B1 | 3/2009 | Zhang et al. |
| 7,516,136 B2 | 4/2009 | Lee et al. |
| 7,536,433 B2 | 5/2009 | Reilly |
| 7,549,160 B1 | 6/2009 | Podar et al. |
| 7,558,862 B1 | 7/2009 | Tyukasz et al. |
| 7,565,681 B2 | 7/2009 | Ngo et al. |
| 7,577,336 B2 | 8/2009 | Srinivasan et al. |
| 7,594,218 B1 | 9/2009 | Lozben |

(56) References Cited

U.S. PATENT DOCUMENTS

| | | |
|---|---|---|
| 7,620,713 B2 | 11/2009 | Tokuhashi et al. |
| 7,631,088 B2 | 12/2009 | Logan et al. |
| 7,647,430 B2 * | 1/2010 | Ng et al. .......... 710/5 |
| 7,676,590 B2 | 3/2010 | Silverman et al. |
| 7,706,358 B2 | 4/2010 | Kitada |
| 7,721,300 B2 | 5/2010 | Tipton et al. |
| 7,721,315 B2 | 5/2010 | Brown et al. |
| 7,895,275 B1 | 2/2011 | Evans et al. |
| 7,917,602 B2 | 3/2011 | Sweatt, III et al. |
| 7,921,150 B1 | 4/2011 | Schwartz |
| 7,945,688 B1 | 5/2011 | Lango et al. |
| 7,962,370 B2 | 6/2011 | Rodriguez et al. |
| 7,975,047 B2 | 7/2011 | Dongre |
| 8,001,471 B2 | 8/2011 | Shaver et al. |
| 8,082,545 B2 | 12/2011 | Prakash |
| 8,171,148 B2 | 5/2012 | Lucas et al. |
| 8,194,681 B2 | 6/2012 | Kaarela et al. |
| 8,209,623 B2 | 6/2012 | Barletta et al. |
| 2001/0021998 A1 | 9/2001 | Margulis |
| 2001/0025308 A1 | 9/2001 | Jinushi et al. |
| 2002/0004839 A1 | 1/2002 | Wine et al. |
| 2002/0010925 A1 | 1/2002 | Kikinis |
| 2002/0012530 A1 | 1/2002 | Bruls |
| 2002/0031333 A1 | 3/2002 | Mano et al. |
| 2002/0042921 A1 | 4/2002 | Ellis |
| 2002/0046404 A1 | 4/2002 | Mizutani |
| 2002/0053053 A1 | 5/2002 | Nagai et al. |
| 2002/0080753 A1 | 6/2002 | Lee |
| 2002/0090029 A1 | 7/2002 | Kim |
| 2002/0105529 A1 | 8/2002 | Bowser et al. |
| 2002/0112247 A1 | 8/2002 | Horner et al. |
| 2002/0122137 A1 | 9/2002 | Chen et al. |
| 2002/0131497 A1 | 9/2002 | Jang |
| 2002/0138843 A1 | 9/2002 | Samaan et al. |
| 2002/0143972 A1 | 10/2002 | Christopoulos et al. |
| 2002/0143973 A1 | 10/2002 | Price |
| 2002/0147634 A1 | 10/2002 | Jacoby et al. |
| 2002/0147687 A1 | 10/2002 | Breiter et al. |
| 2002/0167458 A1 | 11/2002 | Baudisch et al. |
| 2002/0188818 A1 | 12/2002 | Nimura et al. |
| 2002/0191575 A1 | 12/2002 | Kalavade et al. |
| 2003/0001880 A1 | 1/2003 | Holtz et al. |
| 2003/0028873 A1 | 2/2003 | Lemmons |
| 2003/0065915 A1 | 4/2003 | Yu et al. |
| 2003/0074660 A1 | 4/2003 | McCormack et al. |
| 2003/0093260 A1 | 5/2003 | Dagtas et al. |
| 2003/0095791 A1 | 5/2003 | Barton et al. |
| 2003/0115167 A1 | 6/2003 | Sharif et al. |
| 2003/0159143 A1 | 8/2003 | Chan |
| 2003/0187657 A1 | 10/2003 | Erhart et al. |
| 2003/0192054 A1 | 10/2003 | Birks et al. |
| 2003/0198243 A1 | 10/2003 | Yamada |
| 2003/0208612 A1 | 11/2003 | Harris et al. |
| 2003/0231621 A1 | 12/2003 | Gubbi et al. |
| 2004/0003406 A1 | 1/2004 | Billmaier |
| 2004/0052216 A1 | 3/2004 | Roh |
| 2004/0068334 A1 | 4/2004 | Tsai et al. |
| 2004/0083301 A1 | 4/2004 | Murase et al. |
| 2004/0100486 A1 | 5/2004 | Flamini et al. |
| 2004/0103340 A1 | 5/2004 | Sundareson et al. |
| 2004/0139047 A1 | 7/2004 | Rechsteiner et al. |
| 2004/0162845 A1 | 8/2004 | Kim et al. |
| 2004/0162903 A1 | 8/2004 | Oh |
| 2004/0172410 A1 | 9/2004 | Shimojima et al. |
| 2004/0177151 A1 | 9/2004 | Kryeziu |
| 2004/0194141 A1 | 9/2004 | Sanders |
| 2004/0199657 A1 | 10/2004 | Eyal et al. |
| 2004/0205830 A1 | 10/2004 | Kaneko |
| 2004/0212640 A1 | 10/2004 | Mann et al. |
| 2004/0216173 A1 | 10/2004 | Horoszowski et al. |
| 2004/0221029 A1 | 11/2004 | Jenkins et al. |
| 2004/0236844 A1 | 11/2004 | Kocherlakota |
| 2004/0255249 A1 | 12/2004 | Chang et al. |
| 2005/0021398 A1 | 1/2005 | McCleskey et al. |
| 2005/0027821 A1 | 2/2005 | Alexander et al. |
| 2005/0038981 A1 | 2/2005 | Connor et al. |
| 2005/0044058 A1 | 2/2005 | Matthews et al. |
| 2005/0050462 A1 | 3/2005 | Whittle et al. |
| 2005/0053356 A1 | 3/2005 | Mate et al. |
| 2005/0055595 A1 | 3/2005 | Frazer et al. |
| 2005/0060759 A1 | 3/2005 | Rowe et al. |
| 2005/0097542 A1 | 5/2005 | Lee |
| 2005/0114852 A1 | 5/2005 | Chen et al. |
| 2005/0132351 A1 | 6/2005 | Randall et al. |
| 2005/0138560 A1 | 6/2005 | Lee et al. |
| 2005/0155077 A1 | 7/2005 | Lawrence et al. |
| 2005/0198584 A1 | 9/2005 | Matthews et al. |
| 2005/0204046 A1 | 9/2005 | Watanabe |
| 2005/0216851 A1 | 9/2005 | Hull et al. |
| 2005/0227621 A1 | 10/2005 | Katoh |
| 2005/0229118 A1 | 10/2005 | Chiu et al. |
| 2005/0246369 A1 | 11/2005 | Oreizy et al. |
| 2005/0251833 A1 | 11/2005 | Schedivy |
| 2005/0283791 A1 | 12/2005 | McCarthy et al. |
| 2005/0288999 A1 | 12/2005 | Lerner et al. |
| 2006/0011371 A1 | 1/2006 | Fahey |
| 2006/0031381 A1 | 2/2006 | Van Luijt et al. |
| 2006/0050970 A1 | 3/2006 | Gunatilake |
| 2006/0051055 A1 | 3/2006 | Ohkawa |
| 2006/0053378 A1 | 3/2006 | Fano et al. |
| 2006/0064307 A1 | 3/2006 | Pakkala |
| 2006/0095401 A1 | 5/2006 | Krikorian et al. |
| 2006/0095471 A1 | 5/2006 | Krikorian et al. |
| 2006/0095472 A1 | 5/2006 | Krikorian et al. |
| 2006/0095942 A1 | 5/2006 | van Beek |
| 2006/0095943 A1 | 5/2006 | Demircin et al. |
| 2006/0107226 A1 | 5/2006 | Matthews et al. |
| 2006/0117371 A1 | 6/2006 | Margulis |
| 2006/0146174 A1 | 7/2006 | Hagino |
| 2006/0171395 A1 | 8/2006 | Deshpande |
| 2006/0179118 A1 | 8/2006 | Stirbu |
| 2006/0190616 A1 | 8/2006 | Mayerhofer et al. |
| 2006/0206526 A1 | 9/2006 | Sitomer |
| 2006/0230345 A1 | 10/2006 | Weng et al. |
| 2006/0280157 A1 | 12/2006 | Karaoguz et al. |
| 2006/0280177 A1 | 12/2006 | Gupta et al. |
| 2006/0294183 A1 | 12/2006 | Agnoli et al. |
| 2007/0003224 A1 | 1/2007 | Krikorian et al. |
| 2007/0005783 A1 | 1/2007 | Saint-Hillaire et al. |
| 2007/0019545 A1 | 1/2007 | Alt et al. |
| 2007/0022328 A1 | 1/2007 | Tarra et al. |
| 2007/0043792 A1 | 2/2007 | O'Brien |
| 2007/0055728 A1 | 3/2007 | Shea et al. |
| 2007/0067390 A1 | 3/2007 | Agnoli et al. |
| 2007/0073767 A1 | 3/2007 | Springer, Jr. et al. |
| 2007/0074115 A1 | 3/2007 | Patten et al. |
| 2007/0076604 A1 | 4/2007 | Litwack |
| 2007/0107019 A1 | 5/2007 | Romano et al. |
| 2007/0136445 A1 | 6/2007 | Sweatt et al. |
| 2007/0136778 A1 | 6/2007 | Birger et al. |
| 2007/0147263 A1 | 6/2007 | Liao et al. |
| 2007/0168543 A1 | 7/2007 | Krikorian et al. |
| 2007/0180485 A1 | 8/2007 | Dua |
| 2007/0183436 A1 | 8/2007 | Hunter |
| 2007/0198532 A1 | 8/2007 | Krikorian et al. |
| 2007/0217407 A1 | 9/2007 | Yuan et al. |
| 2007/0234213 A1 | 10/2007 | Krikorian et al. |
| 2007/0286596 A1 | 12/2007 | Lonn |
| 2007/0288550 A1 | 12/2007 | Ise et al. |
| 2008/0007651 A1 | 1/2008 | Bennett |
| 2008/0019276 A1 | 1/2008 | Takatsuji et al. |
| 2008/0037573 A1 | 2/2008 | Cohen |
| 2008/0059533 A1 | 3/2008 | Krikorian |
| 2008/0060035 A1 | 3/2008 | Tsang et al. |
| 2008/0134267 A1 | 6/2008 | Moghe et al. |
| 2008/0168359 A1 | 7/2008 | Flick et al. |
| 2008/0195698 A1 | 8/2008 | Stefanovic et al. |
| 2008/0195744 A1 | 8/2008 | Bowra et al. |
| 2008/0199150 A1 | 8/2008 | Candelore |
| 2008/0200154 A1 | 8/2008 | Maharajh et al. |
| 2008/0207137 A1 | 8/2008 | Maharajh et al. |
| 2008/0209487 A1 | 8/2008 | Osann et al. |
| 2008/0215392 A1 | 9/2008 | Rajan |
| 2008/0229404 A1 | 9/2008 | Siegrist et al. |

(56) References Cited

U.S. PATENT DOCUMENTS

| | | | |
|---|---|---|---|
| 2008/0294759 A1 | 11/2008 | Biswas et al. | |
| 2008/0301233 A1 | 12/2008 | Choi | |
| 2008/0307456 A1 | 12/2008 | Beetcher et al. | |
| 2008/0307462 A1 | 12/2008 | Beetcher et al. | |
| 2008/0307463 A1 | 12/2008 | Beetcher et al. | |
| 2009/0007198 A1 | 1/2009 | Lavender et al. | |
| 2009/0074380 A1 | 3/2009 | Boston et al. | |
| 2009/0103607 A1 | 4/2009 | Bajpai et al. | |
| 2009/0133088 A1 | 5/2009 | Kim et al. | |
| 2009/0146779 A1 | 6/2009 | Kumar et al. | |
| 2009/0157777 A1 | 6/2009 | Golwalkar et al. | |
| 2009/0199248 A1 | 8/2009 | Ngo et al. | |
| 2009/0254672 A1 | 10/2009 | Zhang | |
| 2009/0268740 A1 | 10/2009 | Sindhu et al. | |
| 2009/0282445 A1* | 11/2009 | Yang et al. | 725/93 |
| 2010/0005483 A1 | 1/2010 | Rao | |
| 2010/0023642 A1 | 1/2010 | Ladd et al. | |
| 2010/0030880 A1 | 2/2010 | Joshi et al. | |
| 2010/0046513 A1 | 2/2010 | Park et al. | |
| 2010/0061708 A1* | 3/2010 | Barton | 386/124 |
| 2010/0070925 A1 | 3/2010 | Einaudi et al. | |
| 2010/0077438 A1 | 3/2010 | Ansari | |
| 2010/0100898 A1 | 4/2010 | Pfleging et al. | |
| 2010/0100915 A1 | 4/2010 | Krikorian et al. | |
| 2010/0169477 A1 | 7/2010 | Stienhans et al. | |
| 2010/0226444 A1 | 9/2010 | Thevathasan et al. | |
| 2010/0269144 A1 | 10/2010 | Forsman et al. | |
| 2010/0281042 A1 | 11/2010 | Windes et al. | |
| 2010/0309916 A1 | 12/2010 | Oskouy et al. | |
| 2010/0333162 A1 | 12/2010 | Lloyd et al. | |
| 2011/0002381 A1 | 1/2011 | Yang et al. | |
| 2011/0047079 A1 | 2/2011 | Du et al. | |
| 2011/0050908 A1 | 3/2011 | Nam | |
| 2011/0060994 A1 | 3/2011 | Maxwell et al. | |
| 2011/0125861 A1 | 5/2011 | Evans et al. | |
| 2011/0307608 A1 | 12/2011 | Chang et al. | |
| 2011/0321079 A1 | 12/2011 | Lankford | |
| 2012/0039580 A1* | 2/2012 | Sweatt et al. | 386/230 |
| 2012/0066586 A1 | 3/2012 | Shemesh | |
| 2012/0166669 A1 | 6/2012 | Price | |
| 2012/0166965 A1 | 6/2012 | Nathan et al. | |
| 2012/0219001 A1 | 8/2012 | Sindhu et al. | |

FOREIGN PATENT DOCUMENTS

| | | |
|---|---|---|
| DE | 4407319 A1 | 9/1994 |
| EP | 0838945 A | 4/1998 |
| EP | 1077407 A1 | 2/2001 |
| EP | 1255395 A2 | 11/2002 |
| EP | 1443766 A2 | 8/2004 |
| EP | 1691550 A | 8/2006 |
| EP | 1830558 A1 | 9/2007 |
| EP | 2071839 A1 | 6/2009 |
| GB | 2307151 A | 5/1997 |
| JP | 2001211416 A | 8/2001 |
| JP | 2001345766 A | 12/2001 |
| JP | 2003304231 A | 10/2003 |
| JP | 2005229152 A | 8/2005 |
| JP | 200654535 A | 2/2006 |
| JP | 2006295909 | 10/2006 |
| JP | 2007181123 A | 7/2007 |
| JP | 2008172621 A | 7/2008 |
| JP | 2009009582 | 1/2009 |
| JP | 2009077212 A | 4/2009 |
| JP | 2009118032 A | 5/2009 |
| KR | 19990082855 A | 11/1999 |
| KR | 20010211410 A | 8/2001 |
| WO | 0133839 A1 | 5/2001 |
| WO | 0147248 A2 | 6/2001 |
| WO | 0193161 A1 | 12/2001 |
| WO | 03026232 A1 | 3/2003 |
| WO | 03052552 A2 | 6/2003 |
| WO | 03098897 A | 11/2003 |
| WO | 2004032511 A1 | 4/2004 |
| WO | 2005050898 A2 | 6/2005 |
| WO | 2006064454 A1 | 6/2006 |
| WO | 2006074110 A | 7/2006 |
| WO | 2007027891 A2 | 3/2007 |
| WO | 2007051156 A2 | 5/2007 |
| WO | 2007096001 A1 | 8/2007 |
| WO | 2007141555 A2 | 12/2007 |
| WO | 2007149466 A2 | 12/2007 |
| WO | 2008024723 A | 2/2008 |
| WO | 2009073828 A1 | 6/2009 |
| WO | 2009073830 A1 | 6/2009 |

OTHER PUBLICATIONS

Mythtv Wiki, "MythTV User Manual" [Online], Aug. 27, 2007, XP002515046; retrieved from the Internet: <URL: http://www.mythtv.org/wiki?title=User_Manual:Introduction&oldid=25549>.

International Searching Authority, Written Opinion and International Search Report for International Application No. PCT/US2008/077733, mailed Mar. 18, 2009.

International Searching Authority, Written Opinion and International Search Report for International Application No. PCT/US20081087005, mailed Mar. 20, 2009.

Watanabe Y. et al., "Multimedia Database System for TV Newscasts and Newspapers"; Lecture Notes in Computer Science, Springer Verlag, Berlin, Germany; vol. 1554, Nov. 1, 1998, pp. 208-220, XP002402824, ISSN: 0302-9743.

Yasuhiko Watanabe et al., "Aligning Articles in TV Newscasts and Newspapers"; Proceedings of the International Conference on Computationallinguistics, XX, XX, Jan. 1, 1998, pp. 1381-1387, XP002402825.

Sodergard C. et al., "Integrated Multimedia Publishing: Combining TV and Newspaper Content on Personal Channels"; Computer Networks, Elsevier Science Publishers B.V., Amsterdam, Netherlands; vol. 31, No. 11-16, May 17, 1999, pp. 1111-1128, XP004304543, ISSN: 1389-1286.

Ariki Y. et al., "Automatic Classification of TV News Articles Based on Telop Character Recognition"; Multimedia Computing and Systems, 1999; IEEE International Conference on Florence, Italy, Jun. 7-11, 1999, Los Alamitos, California, USA, IEEE Comput. Soc. US; vol. 2, Jun. 7, 1999, pp. 148-152, XP010519373, ISBN: 978-0-7695-0253-3; abstract, paragraph [03.1], paragraph [052], figures 1,2.

USPTO, Non-Final Office Action mailed Dec. 17, 2004; U.S. Appl. No. 09/809,868, filed Mar. 15, 2001.

USPTO, Final Office Action mailed Jul. 28, 2005; U.S. Appl. No. 09/809,868, filed Mar. 15, 2001.

USPTO, Non-Final Office Action mailed Jan. 30, 2006; U.S. Appl. No. 09/809,868, filed Mar. 15, 2001.

USPTO, Final Office Action mailed Aug. 10, 2006; U.S. Appl. No. 09/809,868, filed Mar. 15, 2001.

USPTO, Non-Final Office Action mailed Jun. 19, 2007; U.S. Appl. No. 09/809,868, filed Mar. 15, 2001.

USPTO, Non-Final Office Action mailed Apr. 16, 2008; U.S. Appl. No. 09/809,868, filed Mar. 15, 2001.

USPTO, Final Office Action mailed Sep. 18, 2008; U.S. Appl. No. 09/809,868, filed Mar. 15, 2001.

USPTO, Non-Final Office Action mailed Mar. 31, 2009; U.S. Appl. No. 09/809,868, filed Mar. 15, 2001.

USPTO, Non-Final Office Action mailed May 1, 2008; U.S. Appl. No. 11/111,265, filed Apr. 21, 2005.

USPTO, Final Office Action mailed Dec. 29, 2008; U.S. Appl. No. 11/111,265, filed Apr. 21, 2005.

USPTO, Non-Final Office Action mailed Jun. 8, 2009; U.S. Appl. No. 11/111,265, filed Apr. 21, 2005.

USPTO, Non-Final Office Action mailed Jun. 26, 2008; U.S. Appl. No. 11/620,707, filed Jan. 7, 2007.

USPTO, Final Office Action mailed Oct. 21, 2008; U.S. Appl. No. 11/620,707, filed Jan. 7, 2007.

USPTO, Non-Final Office Action mailed Mar. 25, 2009; U.S. Appl. No. 11/620,707, filed Jan. 7, 2007.

USPTO, Non-Final Office Action mailed Aug. 7, 2008; U.S. Appl. No. 11/620,711, filed Jan. 7, 2007.

USPTO, Final Office Action mailed Feb. 9, 2009; U.S. Appl. No. 11/620,711, filed Jan. 7, 2007.

(56) References Cited

OTHER PUBLICATIONS

USPTO, Non-Final Office Action mailed Feb. 25, 2009; U.S. Appl. No. 11/683,862, filed Mar. 8, 2007.
USPTO, Non-Final Office Action mailed Dec. 24, 2008; U.S. Appl. No. 11/147,985, filed Jun. 7, 2005.
USPTO, Non-Final Office Action mailed Jun. 25, 2008; U.S. Appl. No. 11/428,254, filed Jun. 30, 2006.
USPTO, Final Office Action mailed Feb. 6, 2009; U.S. Appl. No. 11/428,25, filed Jun. 30, 2006.
USPTO, Non-Final Office Action mailed May 15, 2009; U.S. Appl. No. 11/147,664, filed Jun. 7, 2005.
Sonic Blue "ReplayTV 5000 User's Guide," 2002, entire document.
Bluetooth-News; Main Future User Models Document Verification & Qualification: Bluetooth Technical Background, Apr. 21, 1999; pp. 1 of 7 and 2 of 7; http://www.bluetooth.com/v2/news/show.asp 1-2.
Microsoft Corporation; Harman/Kardon "Master Your Universe" 1999.
Matsushita Electric Corporation of America MicroCast : Wireless PC Multimedia Transceiver System, Nov. 1998.
"Wireless Local Area Networks: Issues in Technology and Standards" Jan. 6, 1999.
USPTO, Final Office Action mailed Jun. 25, 2009; U.S. Appl. No. 11/147,985, filed Jun. 7, 2005.
International Search Report and Written Opinion for International Application No. PCT/US2006/025911, mailed Jan. 3, 2007.
International Search Report for International Application No. PCT/US2007/063599, mailed Dec. 12, 2007.
International Search Report for International Application No. PCT/US2007/076337, mailed Oct. 20, 2008.
International Search Report and Written Opinion for International Application No. PCT/US2006/025912, mailed Jul. 17, 2008.
International Search Report for International Application No. PCT/US2008/059613, mailed Jul. 21, 2008.
International Search Report and Written Opinion for International Application No. PCT/US2008/080910, mailed Feb. 16, 2009.
Wikipedia "Slingbox" [Online], Oct. 21, 2007, XP002512399; retrieved from the Internet: <URL:http://en.wikipedia.org/w/index.php?title=Slingbox&oldid=166080570>; retrieved on Jan. 28, 2009.
Wikipedia "LocationFree Player" [Online], Sep. 22, 2007, XP002512400; retrieved from the Internet: <URL: http://en.wikipedia.org/w/index.php?title=LocationFree_Player&oldid=159683564>; retrieved on Jan. 28, 2009.
Capable Networks LLC "Keyspan Remote Control—Controlling Your Computer With a Remote" [Online], Feb. 21, 2006, XP002512495; retrieved from the Internet: <URL:http://www.slingcommunity.com/article/11791/Keyspan-Remote-Control---Controlling-Your-Computer-With-a-Remote/?highlight=remote+control>; retrieved on Jan. 28, 2009.
Sling Media Inc. "Slingbox User Guide" [Online] 2006, XP002512553; retrieved from the Internet: <URL:http://www.slingmedia.hk/attach/en-US_Slingbox_User_Guide_v12.pdf>; retrieved on Jan. 29, 2009.
Sony Corporation "LocationFree TV" [Online], 2004, SP002512410; retrieved from the Internet: <URL:http://www.docs.sony.com/release/LFX1_X5revision.pdf>; retrieved on Jan. 28, 2009 [note—document uploaded in two parts as file exceeds the 25MB size limit].
Sony Corporation "LocationFree Player Pak—LocationFree Base Station—LocationFree Player" [Online] 2005, XP002512401; retrieved from the Internet: <URL:http://www.docs.sony.com/release/LFPK1.pdf>; retrieved on Jan. 28, 2009.
Krikorian, Jason, U.S. Appl. No. 11/734277, filed Apr. 12, 2007.
Tarra, Raghuveer et al., U.S. Appl. No. 60/975239, filed Sep. 26, 2007.
Williams, George Edward, U.S. Appl. No. 12/167,041, filed Jul. 2, 2008.
Rao, Padmanabha R., U.S. Appl. No. 12/166039, filed Jul. 1, 2008.
International Search Report and Written Opinion, PCT/US2005/020105, Feb. 15, 2007, 6 pages.
International Search Report and Written Opinion for PCT/US2006/04382, mailed Apr. 27, 2007.
Archive of "TV Brick Home Server," www.tvbrick.com, [online] [Archived by http://archive.org on Jun. 3, 2004; Retrieved on Apr. 12, 2006] retrieved from the Internet <URL:http://web.archive.org/web/20041107111024/www.tvbrick.com/en/affiliate/tvbs/tvbrick/document18/print>.
Faucon, B. "TV 'Brick' Opens up Copyright Can of Worms," Financial Review, Jul. 1, 2003, [online [Retrieved on Apr. 12, 2006] Retrieved from the Internet, URL:http://afr.com/cgi-bin/newtextversions.pl?storyid+1056825330084&3ate+2003/07/01&pagetype+printer§ion+1053801318705&path+articles/2003/06/30/0156825330084.html].
Balster, Eric J., "Video Compression and Rate Control Methods Based on the Wavelet Transform," The Ohio State University 2004, pp. 1-24.
Kulapala et al., "Comparison of Traffic and Quality Characteristics of Rate-Controlled Wavelet and DCT Video," Arizona State University, Oct. 11, 2004.
Skodras et al., "JPEG2000: The Upcoming Still Image Compression Standard," May 11, 2000, 14 pages.
Taubman et al., "Embedded Block Coding in JPEG2000," Feb. 23, 2001, pp. 1-8 of 36.
Kessler, Gary C., An Overview of TCP/IP Protocols and the Internet; Jan. 16, 2007, retrieved from the Internet on Jun. 12, 2008 at http://www.garykessler.net/library/tcpip.html; originally submitted to the InterNIC and posted on their Gopher site on Aug. 5, 1994.
Roe, Kevin, "Third-Party Observation Under EPC Article 115 on the Patentability of an Invention," Dec. 21, 2007.
Roe, Kevin, Third-Party Submission for Published Application Under CFR §1.99, Mar. 26, 2008.
Bajpai, Parimal et al. "Systems and Methods of Controlling the Encoding of a Media Stream," U.S. Appl. No. 12/339,878, filed Dec. 19, 2008.
Malone, Edward D. et al. "Systems and Methods for Controlling Media Devices," U.S. Appl. No. 12/256,344, filed Oct. 22, 2008.
Banger, Shashidhar et al. "Systems and Methods for Determining Attributes of Media Items Accessed via a Personal Media Broadcaster," U.S. Appl. No. 12/334,959, filed Dec. 15, 2008.
Kulkarni, Anant Madhava "Systems and Methods for Creating Logical Media Streams for Media Storage and Playback," U.S. Appl. No. 12/323,907, filed Nov. 26, 2008.
Rao, Padmanabha R. "Systems and Methods for Linking Media Content," U.S. Appl. No. 12/359,784, filed Jan. 26, 2009.
Krikorian, Blake Gary et al. "Systems and Methods for Presenting Media Content Obtained From Multiple Sources," U.S. Appl. No. 12/408,456, filed Mar. 20, 2009.
Krikorian, Blake Gary et al. "Systems and Methods for Projecting Images From a Computer System," U.S. Appl. No. 12/408,460, filed Mar. 20, 2009.
China State Intellectual Property Office "First Office Action," issued Jul. 31, 2009, for Application No. 200580026825.X.
USPTO, Non-Final Office Action, mailed Aug. 4, 2009; U.S. Appl. No. 11/734,277, filed Apr. 12, 2007.
USPTO, Final Office Action, mailed Jul. 31, 2009; U.S Appl. No. 11/683,862, filed Mar. 8, 2007.
USPTO, Non-Final Office Action, mailed Aug. 5, 2009; U.S. Appl. No. 11/147,663, filed Jun. 7, 2005.
USPTO, Non-Final Office Action, mailed Sep. 3, 2009; U.S. Appl. No. 11/620,711, filed Jan. 7, 2007.
Einaudi, Andrew E. et al. "Systems and Methods for Selecting Media Content Obtained from Multiple Sources," U.S. Appl. No. 12/543,278, filed Aug. 18, 2009.
Malode, Deepak Ravi "Remote Control and Method for Automatically Adjusting the Volume Output of an Audio Device," U.S. Appl. No. 12/550,145, filed Aug. 28, 2009.
Akella, Aparna Sarma "Systems and Methods for Event Programming via a Remote Media Player," U.S. Appl. No. 12/537,057, filed Aug. 6, 2009.
Shah, Bhupendra Natwerlan et al. "Systems and Methods for Transcoding and Place Shifting Media Content," U.S. Appl. No. 12/548,130, filed Aug. 26, 2009.

(56) References Cited

OTHER PUBLICATIONS

Banger, Shashidhar et al. "Systems and Methods for Automatically Controlling the Resolution of Streaming Video Content," U.S. Appl. No. 12/537,785, filed Aug. 7, 2009.
Panigrahi, Biswaranjan "Home Media Aggregator System and Method," U.S. Appl. No. 12/538,681, filed Aug. 10, 2009.
Nandury, Venkata Kishore "Adaptive Gain Control for Digital Audio Samples in a Media Stream," U.S. Appl. No. 12/507,971, filed Jul. 23, 2009.
Shirali, Amey "Systems and Methods for Providing Programming Content," U.S. Appl. No. 12/538,676, filed Aug. 10, 2009.
Thiyagarajan, Venkatesan "Systems and Methods for Virtual Remote Control of Streamed Media," U.S. Appl. No. 12/538,664, filed Aug. 10, 2009.
Thiyagarajan, Venkatesan et al. "Localization Systems and Method," U.S. Appl. No. 12/538,783, filed Aug. 10, 2009.
Shirali, Amey et al. "Methods and Apparatus for Seeking Within a Media Stream Using Scene Detection," U.S. Appl. No. 12/538,784, filed Aug. 10, 2009.
Thiyagarajan, Venkatesan "Systems and Methods for Updating Firmware Over a Network," U.S. Appl. No. 12/538,661, filed Aug. 10, 2009.
Iyer, Satish "Methods and Apparatus for Fast Seeking Within a Media Stream Buffer," U.S. Appl. No. 12/538,659, filed Aug. 10, 2009.
European Patent Office, International Searching Authority, "International Search Report," for International Application No. PCT/US2009/049006, mailed Sep. 11, 2009.
Conway, Frank et al. "Systems and Methods for Creating Variable Length Clips from a Media Stream," U.S. Appl. No. 12/347,465, filed Dec. 31, 2008.
Lucas, Brian et al., "Systems and Methods for Establishing Connections Between Devices Communicating Over a Network," U.S. Appl. No. 12/426,103, filed Apr. 17, 2009.
USPTO, Final Office Action, mailed Nov. 6, 2009; U.S. Appl. No. 09/809,868, filed Mar. 15, 2001.
Thiyagarajan, Venkatesan et al. "Always-On-Top Media Player Launched From a Web Browser," U.S. Appl. No. 12/617,271, filed Nov. 12, 2009.
Newton's Telecom Dictionary, 21st ed., Mar. 2005.
European Patent Office, European Search Report, mailed Sep. 28, 2009 for European Application No. EP 06 78 6175.
Paul, John Michael et al. "Systems and Methods for Delivering Messages Over a Network," U.S. Appl. No. 12/619,192, filed Nov. 16, 2009.
USPTO, Final Office Action mailed Nov. 12, 2009; U.S. Appl. No. 11/620,707, filed Jan. 7, 2007.
USPTO, Non-Final Office Action mailed Nov. 23, 2009; U.S. Appl. No. 11/683,862, filed Mar. 8, 2007.
International Search Report for PCT/US2008/069914 mailed Dec. 19, 2008.
Ditze M. et all "Resource Adaptation for Audio-Visual Devices in the UPnP QoS Architecture," Advanced Networking and Applications, 2006; AINA, 2006; 20% H International conference on Vienna, Austria Apr. 18-20, 2006.
Joonbok, Lee et al. "Compressed High Definition Television (HDTV) Over IPv6," Applications and the Internet Workshops, 2006; Saint Workshops, 2006; International Symposium, Phoenix, AZ, USA, Jan. 23-27, 2006.
Lowekamp, B. et al. "A Hierarchy of Network Performance Characteristics for Grid Applications and Services," GGF Network Measurements Working Group, pp. 1-29, May 24, 2004.
USPTO, Non-Final Office Action mailed Oct. 1, 2009; U.S. Appl. No. 11/778,287, filed Jul. 16, 2007.
Rao, Padmanabha R. et al. "Methods and Apparatus for Establishing Network Connections Using an Inter-Mediating Device," U.S. Appl. No. 12/642,368, filed Dec. 18, 2009.
Dham, Vikram et al. "Systems and Methods for Establishing Network Connections Using Local Mediation Services," U.S. Appl. No. 12/644,918, filed Dec. 22, 2009.
Australian Government "Office Action," Australian Patent Application No. 2006240518, mailed Nov. 12, 2009.
USPTO Final Office Action mailed Dec. 30, 2009; U.S. Appl. No. 11/147,664, filed Jun. 7, 2005.
Meyer, Derrick "MyReplayTV™ Creates First-Ever Online Portal to Personal TI! Service; Gives Viewers Whole New Way to Interact With Programming," http://web.archive.org/web/20000815052751/http://www.myreplaytv.com/, Aug. 15, 2000.
Sling Media "Sling Media Unveils Top-of-Line Slingbox PRO-HD" [online], Jan. 4, 2008, XP002560049; retrieved from the Internet: URL:www.slingmedia.com/get/pr-slingbox-pro-hd.html; retrieved on Oct. 12, 2009.
PCT Partial International Search, PCT/US2009/054893, mailed Dec. 23, 2009.
Bajpal, Parimal et al. "Method and Node for Transmitting Data Over a Communication Network using Negative Ackhowledgement," U.S. Appl. No. 12/404,920, filed Mar. 16, 2009.
Bajpal, Parimal et al. "Method and Note for Employing Network connections Over a Connectinoless Transport Layer Protocol," U.S Appl. No. 12/405,062, filed Mar. 16, 2009.
Asnis, Ilya et al. "Mediated Network address Translation Traversal" U.S. Appl. No. 12/405,039, filed Mar. 16, 2009.
Srisuresh, P. et al. "Traditional IP Network Address Translator (Traditional NAT)," Network Working Group, The Internet Society, Jan. 2001.
Gangotri, Arun L. et al. "Systems, Methods, and Program Applications for Selectively Restricting the Placeshifting Protected Digital Media Content," U.S. Appl. No. 12/623,955, filed Nov. 23, 2009.
Paul, John et al. "Systems and Methods for Searching Media Content," U.S. Appl. No. 12/648,024, filed Dec. 28, 2009.
European Patent Office, International Searching Authority, "International Search Report," mailed Dec. 13, 2010; International Application No. PCT/US2010/029062 filed Mar. 29, 2010.
USPTO "Notice of Allowance" mailed Jan. 10, 2012; U.S. Appl. No. 12/426,103, filed Apr. 17, 2009.
China State Intellectual Property Office "First Office Action," issued Jan. 8, 2010, for Application No. 200810126554.0.
USPTO Final Office action mailed Jan. 25, 2010; U.S. Appl. No. 11/734,277, filed Apr. 12, 2007.
Gurzhi, Alexander et al. "Systems and Methods for Emulation Network-Enabled Media Components," U.S. Appl. No. 12/711,830, filed Feb. 24, 2010.
Jain, Vikal Kumar "Systems and Methods for Coordinating Data Communication Between Two Device," U.S. Appl. No. 12/699,280, filed Feb. 3, 2010.
"The Authoritative Dictionary of IEEE Standard Terms," 7th ed. 2000.
Newton's Telcom Dictionary, 20th ed., Mar. 2004.
USPTO Final Office Action mailed Mar. 3, 2010; U.S. Appl. No. 11/111,265, filed Apr. 21, 2005.
USPTO Final Office Action mailed Mar. 12, 2010; U.S. Appl. No. 11/620,711, filed Jan. 7, 2007.
European Patent Office, International Searching Authority, "International Search Report," mailed Mar. 30, 2010; International Application PCT/US2009/068468 filed Dec. 27, 2009.
USPTO Non-Final Office Action mailed Mar. 19, 2010; U.S. Appl. No. 11/147,664, filed Jun. 7, 2005.
USPTO Non-Final Office Action mailed Mar. 31, 2010; U.S. Appl. No. 11/620,707, filed Jan. 7, 2007.
USPTO Non-Final Office Action mailed Apr. 1, 2010; U.S. Appl. No. 12/237,103, filed Sep. 24, 2008.
Qiong, Liu et al. "Digital Rights Management for Content Distribution," Proceedings of the Australasian Information Security Workshop Conference on ACSW Frontiers 2003, vol. 21, 2003, XP002571073, Adelaide, Australia, ISSN: 1445-1336, ISBN: 1-920682-00-7, sections 2 and 2.1.1.
USPTO "Non-Final Office Action" mailed Mar. 21, 2011; U.S. Appl. No. 12/426,103, filed Apr. 17, 2009.
European Patent Office, International Searching Authority, "International Search Report" mailed Mar. 18, 2011; International Appln. No. PCT/US2010/060797, filed Dec. 16, 2010.
China State Intellectual Property Office "Office Action" issued Mar. 18, 2010 for Application No. 200680022520.6.

(56) References Cited

OTHER PUBLICATIONS

China State Intellectual Property Office "Office Action" issued Apr. 13, 2010 for Application No. 200580026825.X.
Canadian Intellectual Property Office "Office Action" mailed Feb. 18, 2010 for Application No. 2569610.
European Patent Office "European Search Report," mailed May 7, 2010 for Application No. 06786174.0.
Margulis, Neal "Apparatus and Method for Effectively Implementing a Wireless Television System," U.S. Appl. No. 12/758,193, filed Apr. 12, 2010.
Margulis, Neal "Apparatus and Method for Effectively Implementing a Wireless Television System," U.S. Appl. No. 12/758,194, filed Apr. 12, 2010.
Margulis, Neal "Apparatus and Method for Effectively Implementing a Wireless Television System," U.S. Appl. No. 12/758,196, filed Apr. 12, 2010.
Kirkorian, Jason Gary et al. "Personal Media Broadcasting System with Output Buffer," U.S. Appl. No. 12/757,697, filed Apr. 9, 2010.
Tarra, Raghuveer et al. "Firmware Update for Consumer Electronic Device," U.S. Appl. No. 12/757,714, filed Apr. 9, 2010.
USPTO "Non-Final Office Action" mailed Apr. 27, 2012; U.S. Appl. No. 12/821,983, filed Jun. 23, 2010.
Lee, M. et al. "Video Frame Rate Control for Non-Guaranteed Network Services with Explicit Rate Feedback," Globecom'00, 2000 IEEE Global Telecommunications conference, San Francisco, CA, Nov. 27-Dec. 1, 2000; [IEEE Global Telecommunications Conference], New York, NY; IEEE, US, vol. 1, Nov. 27, 2000, pp. 293-297, XP001195580; ISBN: 978-0-7803-6452-3, lines 15-20 of sec. II on p. 293, fig. 1.
European Patent Office, International Searching Authority, "International Search Report and Written Opinion," mailed Jun. 4, 2010 for International Application No. PCT/IN2009/000728, filed Dec. 18, 2009.
USPTO Non-Final Office Action mailed Jun. 23, 2010; U.S. Appl. No. 11/933,969, filed Nov. 1, 2007.
Korean Intellectual Property Office "Official Notice of Preliminary Rejection," issued Jun. 18, 2010; Korean Patent Application No. 10-2008-7021254.
USPTO "Non-Final Office Action" mailed Jun. 27, 2012 for U.S. Appl. No. 13/458,852, filed Apr. 27, 2012.
USPTO "Final Office Action" mailed Aug. 7, 2012 for U.S. Appl. No. 12/821,983, filed Jun. 23, 2010.
USPTO "Non-Final Office Action" mailed Jul. 19, 2012 for U.S. Appl. No. 12/619,192, filed Nov. 16, 2009.
USPTO "Final Office Action" mailed Oct. 17, 2011; U.S. Appl. No. 12/426,103, filed Apr. 17, 2009.
European Patent Office, International Searching Authority, "International Search Report" mailed Nov. 16, 2011; International Patent Appln. No. PCT/US2011/039937, filed Jun. 10, 2011.
Canadian Intellectual Property Office, "Office Action" mailed May 17, 2013 for Canadian Patent Application No. 2,758,791.
Intellectual Property Office of Singapore, "Search Report and Written Opinion," mailed May 30, 2013 for Singapore Patent Application No. 201204603-3.
Intellectual Property Office, "Office Action" mailed Apr. 26, 2013 for Taiwan Patent Application No. 099111307.
USPTO "Non-Final Office Action" mailed Feb. 25, 2013 for U.S. Appl. No. 13/458,852.
USPTO "Non-Final Office Action" mailed Apr. 1, 2013 for U.S. Appl. No. 13/098,198.
USPTO "Non-Final Office Action" mailed Sep. 14, 2012 for U.S. Appl. No. 12/635,138, filed Dec. 10, 2009.
USPTO "Final Office Action" mailed Feb. 21, 2013 for U.S. Appl. No. 12/619,192, filed Nov. 16, 2009.
USPTO "Non-Final Office Action" mailed Dec. 21, 2012 for U.S. Appl. No. 12/648,024, filed Dec. 28, 2009.
Intellectual Property Office of Singapore "Search Report and Written Opinion" dated Nov. 8, 2012 for Singapore Appln. No. 201107539-7.
Intellectual Property Office "Office Action" issued May 20, 2013 for Taiwan Patent Appln. No. 099144605.
USPTO "Notice of Allowance" mailed Jun. 24, 2013 for U.S. Appl. No. 12/635,138.
Japan Patent Office "Notice of Rejection Ground" dated Mar. 26, 2013 for Japanese Patent Appln. No. 2012-506055.
Australian Government "Patent Examination Report No. 1" dated Apr. 5, 2013 for Australian Patent Appln. No. 2010236888.
Japan Patent Office, Notice of Rejection Grounds mailed Jan. 21, 2014 for Japanese Patent Application No. 2013-516600.
Hungarian Intellectual Property Office As Examiner According to the Memorandum of Understanding Between Intellectual Property Office of Singapore and the Hungarian Intellectual Property Office, Examination Report mailed Jan. 16, 2014 for Singapore Patent Application No. 201204603-3.
Canadian Intellectual Property Office, Official Action, mailed Jan. 23, 2014 for Canadian Patent Application No. 2,803,796.
USPTO "Final Office Action" dated Nov. 5, 2013 for U.S. Appl. No. 13/098,198.
USPTO "Final Office Action" dated Jul. 26, 2013 for U.S. Appl. No. 13/098,198.
USPTO "Non-Final Office Action" dated Oct. 17, 2013 for U.S. Appl. No. 12/648,024.
USPTO "Final Office Action" dated Nov. 18, 2013 for U.S. Appl. No. 13/458,852.
Australian Government, Patent Examination Report No. 1, dated Nov. 15, 2013 for Australian Patent Application No. 2011271358.
China State Intellectual Property Office, First Office Action, dated Nov. 8, 2013 for China Patent Application No. 201080016835.6.
Japan Patent Office, Notice of Rejection Ground mailed Oct. 29, 2013 for Japanese Patent Application No. 2012-546061.
Japan Patent Office, Notice of Rejection Grounds, dated Dec. 3, 2013 for Japanese Patent Application No. 2012-506055.
Intellectual Property Office of Singapore, Search and Examination Report, dated Aug. 30, 2013 for Singapore Patent Application No. 201107539-7.
Intellectual Property Office, Office Action, dated Dec. 30, 2013 for Taiwan Patent Application No. 099144605.
Canadian Intellectual Property Office, Notice of Allowance, dated Jun. 30, 2014 for Canadian Patent Application No. 2,758,791.
Australian Government, Notice of Acceptance, dated Jul. 16, 2014 for Australian Patent Application No. 2010236888.
USPTO, Non-Final Office Action, dated Jul. 16, 2014 for U.S. Appl. No. 13/098,198.
Proxy server. The Free On-line Dictionary of Computing. Denis Howe. May 26, 2014. <Dictionary.com http://dictionary.reference.com/browse/proxy server>.
Fielding et al. Hypertext Transfer Protocol—HTTP/1.1 RFC 2616—Section 8 Connections. available Jan. 27, 2001. retrieved from <http://www.w3.org/Protocols/rfc2616/rfc2616-sec8.html> via Internet Archive on <May 25, 2014>.
USPTO, Final Office Action, mailed Aug. 14, 2014 for U.S. Appl. No. 12/648,024.
China State Intellectual Property Office, Office Action, dated Aug. 27, 2014 for China Patent Application No. 201080016835.6.
Japan Patent Office, "Decision of Rejection" mailed Jun. 3, 2014 for Japanese Patent Application No. 2012-506055.
Japan Patent Office, "Decision of Dismissal of Amendment" mailed Jun. 3, 2014 for Japanese Patent Application No. 2012-506055.
Korean Intellectual Property Office, "Notice of Allowance" mailed Jun. 9, 2014 for Korean Patent Application No. 10-2013-7001665.
USPTO, "Non-Final Office Action" mailed Jun. 19, 2014 for U.S. Appl. No. 12/821,983.
U.S. Patent and Trademark Office, Notice of Allowance, mailed May 9, 2014 for U.S. Appl. No. 13/458,852.
Australian Government, Notice of Acceptance, dated May 29, 2014 for Australian Patent Application No. 2011271358.

\* cited by examiner

SYSTEMS AND METHODS FOR REMOTELY CONTROLLING A MEDIA SERVER VIA A NETWORK

TECHNICAL FIELD

The present disclosure generally relates to systems and methods for controlling a media recorder, server and/or other device over a network. Such systems and techniques may be useful, for example, in remotely controlling set-top boxes, digital video recorders (DVRs), placeshifting devices and/or other types of media devices.

BACKGROUND

The Internet and other digital communications networks continue to have significant effects on every aspect of personal and professional life. Network communications are becoming increasingly ubiquitous due to the reduced cost and increased capability of portable computing devices, as well as the increasing prevalence and capability of mobile telephony and other wireless communications technologies. Additionally, more and more devices, including set top boxes (STBs), television receivers, personal or digital video recorders (DVRs), placeshifting devices and the like are becoming enabled for communications over digital networks. Consumers are therefore expecting convenient control of their media content from a wide range of locations and settings.

A challenge often arises, however, in remotely controlling network-enabled media devices such as STBs, DVRs, placeshifting devices, and the like. Firewalls and other security mechanisms, for example, can limit direct access to consumer devices that are located on a home network. As a result, difficulties can arise in contacting the device to record or view programming, to change settings on the device, to view content available via the device, or to perform other tasks. Although some have attempted to establish communications with media devices over the Internet or other networks, these limited solutions have typically relied upon periodic polling by the device to obtain any commands from a remote server. These polling schemes are prone to processing delays, as well as a lack of convenient feedback or confirmation when a user requests an action. Further, the types of actions that are available through polling schemes have, in practice, been severely limited.

As a result, it is now desirable to create systems and methods for controlling a DVR, STB, placeshifting device or other network-enabled media server device. Such systems and methods would ideally provide a rich set of control options that would be available from a wide array of client devices. These and other desirable features and characteristics will become apparent from the subsequent detailed description and the appended claims, taken in conjunction with the accompanying drawings and this background section.

BRIEF SUMMARY

According to various exemplary embodiments, systems and methods are described for remotely controlling a personal or digital video recorder (PVR/DVR), a set top box (STB), a placeshifting device or system that communicates with a PVR/DVR or the like, and/or another media server. In some embodiments, a real-time, semi-real-time or other communications session is established between a server host and the media server in response to a connection request received from the client. Information about the content processed at the media server is received via the session and provided to the client. In response to subsequent instructions received from the client, the media server can be controlled and/or other actions can be taken using the session. Programs stored on the media server may be deleted, for example, or additional programs can be recorded. Other embodiments may provide control instructions to change channels, to fast forward or rewind content, to adjust user preferences, and/or to take any other actions as desired.

Other embodiments relate to host systems that communicate via a network with a client and a media server having stored programming content. The system suitably comprises a message server configured to communicate with the media server via the network using a pre-existing connection, and a guide server. The guide server is appropriately configured to receive a request for a connection to the media server from the client via the network, to direct the message server to contact the media server in response to the request, to establish a session via the network with the media server, to receive information about the media content stored at the media server via the session, to provide the information about the media content to the client, to receive an instruction from the client to control the media server, and, in response to the instruction received from the client, and to direct the media server via the session to execute the instruction.

Still other embodiments provide a method executable by a guide server or other host communicating via a network with a client and with a media recorder having stored media content. A first message is received from the client at the host via the network, wherein the first message identifies the media recorder. In response to the first message, a second message is transmitted to a message server having a pre-existing connection with the identified media recorder. In response to a third message received from the media recorder, a session is created between the media recorder and the host via the network. Program guide information is provided from the host to the client via the network, and an instruction to record a program identified in the program guide information is received from the client at the host. In response to receiving the instruction, the media recorder is directed via the session to record the identified program.

Various other embodiments, aspects and features are described in more detail below.

BRIEF DESCRIPTION OF THE DRAWING FIGURES

Exemplary embodiments will hereinafter be described in conjunction with the following drawing figures, wherein like numerals denote like elements, and FIG. 1 is a block diagram of an exemplary guide server host system;

FIG. 2. is a diagram showing an exemplary processes for controlling a remote media server;

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

According to various embodiments, a guide server or other host is able to establish a real-time session with a set top box (STB), television receiver, personal or digital video recorder (DVR), placeshifting device, file server or other media server that allows for direct and convenient control of the device using web or other network-based features. The networked host may be used in some embodiments to set preferences, to choose programs to be recorded by the server, to manage programs previously stored, and/or any other functions as appropriate. For example, in some embodiments the host is able to retrieve real-time (or near real-time) information about media content stored on the media server, thereby allowing for convenient search and management of the stored files, as well as the ability to direct new recordings of future programming, and/or to take other actions as desired. The host may also provide searching or other features; in some embodiments, searching may consider programming stored on the media server as well as program guide information, information about on-demand content and/or any other available information to create a very powerful search experience.

Unlike techniques that rely upon intermittent polling by the remote device to obtain instructions or other information, various embodiments are able to establish real-time connections with the remote media device through the use of a messaging server that maintains a pre-existing connection with the media server. When a user wants to open a control or other session with the remote media server, the pre-existing connection can be used to establish a relatively immediate session with the online host, thereby allowing commands and other messages to be "pushed" to the media server in real-time (or near real time) rather than waiting for the media server to "pull" the information from the host.

This relative immediacy provides a greatly improved user experience, as well as access to a much wider array of features. By providing direct, real-time access to the media server device, for example, some implementations of the host are able to provide access to most, if not all, of the functionality that would be available from a directly-connected client application, but in a convenient web interface. Various embodiments therefore provide a relatively robust set of functions and features to the viewer that can be conveniently accessed using conventional web or similar features. Other embodiments may provide alternate or additional features, as desired.

Figure 1:
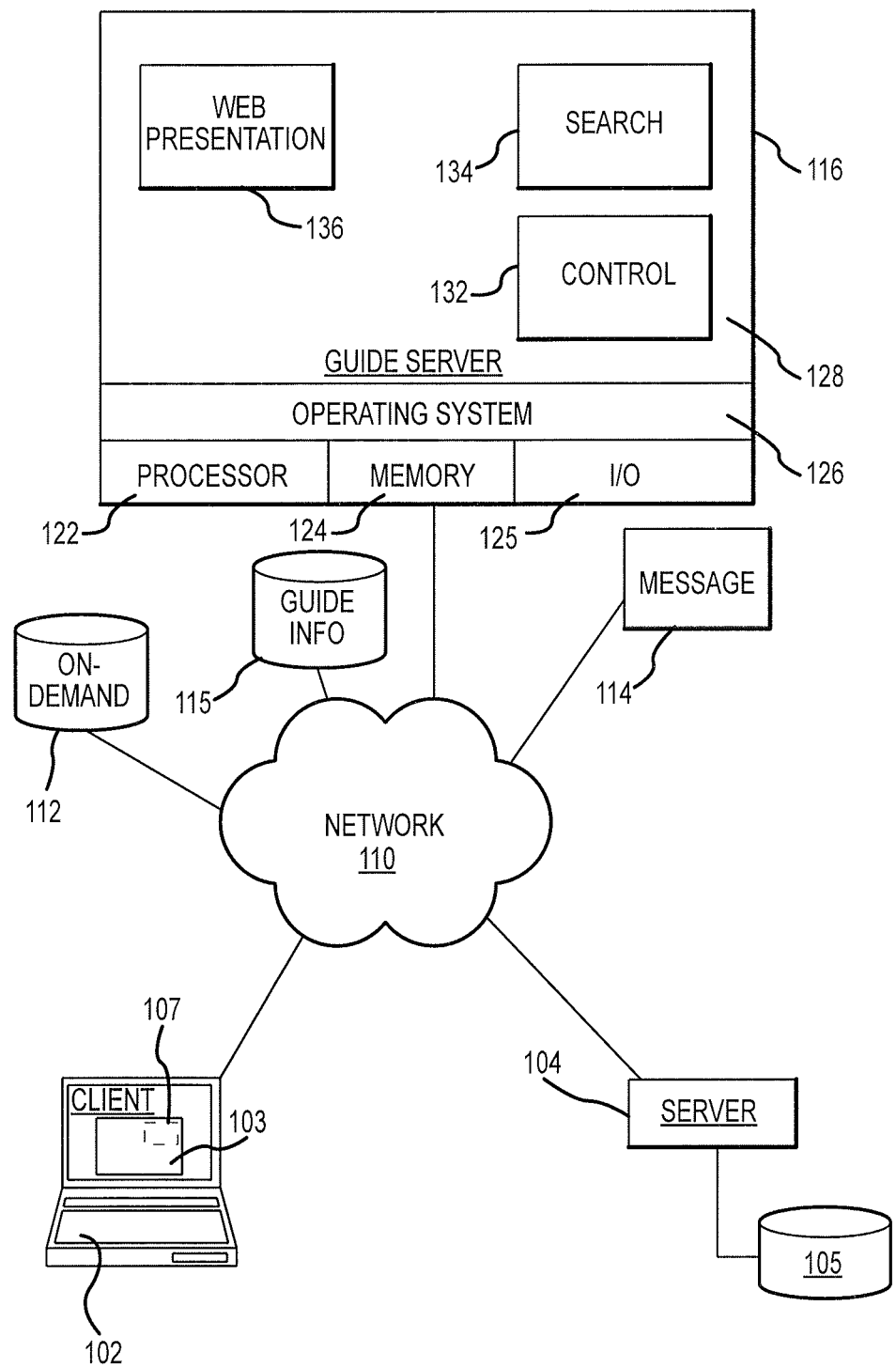

Turning now to the drawing figures and with initial reference to FIG. 1, an exemplary system 100 for remotely controlling a media server 104 suitably includes a client 102 that gains to access a guide server or other host 116 via a network no. The client 102 may interact with the guide server host 116 using a conventional web browser 103 in some embodiments. Upon receiving a request from a client 102, host 116 is able to establish a session with the media server 104 to obtain information about programming or other media content 105 available to the server 104. This information may be appropriately processed and/or formatted (e.g., as a web page or the like) and provided to client 102 via network no. Other information (e.g., program guide information 115) may also be provided to the client 102. In various embodiments, a user of client 102 provides an instruction to record an upcoming program, to delete a stored program, and/or to otherwise change the content 105 that is forwarded to host 116. Upon receipt of such an instruction from client 102, host 116 appropriately directs the server 104 to execute the instruction.

Other embodiments may provide other functions or features. Some implementations may provide robust searching of content 105, for example. Such searching may consider program guide information 115, information 112 about on-demand programming, and/or other information as desired in addition to information obtained from media server 104. Other embodiments may additionally or alternately provide the ability to change preferences or other settings on media server 104, to view media content 105 in a web browser or other window, and/or to take any other actions as may be desired.

Client 102 may be any device, component, module, hardware, software application and/or the like that is capable of communicating over network 110. To that end, many different types of clients 102 may be implemented with any sort of general or special purpose hardware, software and/or firmware. In some embodiments, client 102 may be a conventional personal computer, portable computer, workstation and/or other computing system. In still other embodiments, some types of clients 102 may include personal digital assistants, video game players, mobile telephones, network appliances, network-enabled remote controls and/or any other devices capable of communicating on network no.

In the embodiment shown in FIG. 1, client 102 executes any sort of conventional browser application 103 that is compatible with standard Internet, world wide web (WWW) and/or other formats. Conventional web browsers available for a number of different computing platforms include the INTERNET EXPLORER, MOZILLA FIREFOX, SAFARI, CHROME, and OPERA browsers, as well as many others. Such browsers 103 are typically capable of displaying active or other documents formatted in accordance with published protocols (e.g., hypertext markup language (HTML), extensible markup language (XML), and/or the like). Many browsers 103 are also capable of executing "plugin" applications, applets or the like. Such plugins may be formatted in accordance with ActiveX, JAVA and/or any number of other formats.

In some embodiments, client 102 includes a media application 107. This application 107 may be a standalone media player that executes separately from browser 103 so that browser 103 may not be needed. In other embodiments, the media application 107 could be implemented as a plugin or other applet that runs within browser 103 as desired. In some embodiments, media application 107 is initially obtained from a networked host, such as host 116. The application may be retrieved on an as-needed basis in some embodiments, or may be stored at client 102 for subsequent execution. Some embodiments may not provide media viewing on client 102; such clients 102 may nevertheless be able to interact with host 116 to select programs to record, to change preferences, to control the operations of media server 104, and/or to take other actions related to media server 104.

Network no is any digital or other communications network capable of transmitting messages between senders (e.g., media server 104) and receivers (e.g., media server 104). In various embodiments, network no includes any number of public or private data connections, links or networks supporting any number of communications protocols. Network no may include the Internet, for example, or any other network. Such networks may be based upon TCP/IP or other conventional protocols, although other embodiments may use any type of alternate or successor protocols, as desired. In various embodiments, network no may also incorporate a wireless and/or wired telephone network, such as a cellular communications network for communicating with mobile phones, personal digital assistants, and/or the like. Various embodiments of network no may also incorporate any sort of wireless or wired local area networks, such as one or more IEEE 802.3 and/or IEEE 802.11 networks.

Media server 104 is any device or system communicating on network 110 that is capable of receiving, recording, placeshifting and/or otherwise processing media content 105. In various embodiments, media server 104 includes a personal or digital video recorder (DVR) feature that allows the server 104 to record received programming for later viewing. A DVR may a standalone device, or may be integrated within any sort of receiver (e.g., a cable, direct broadcast satellite (DBS) or other set top box (STB)) that is capable of receiving and demodulating programming signals. Other embodiments of media server 104 may include any sort of standalone or hybrid media players, file servers and/or the like that are capable of receiving, storing or otherwise processing streaming or file-based content 105 of any sort. Still other embodiments of media server 104 could implement a networked gaming server or other media service as desired.

Content 105 is any sort of file-based programming or other content that is accessible to media server 104. In various embodiments, content 105 represents stored programming that is received from an internal or external television receiver. Content 105 may also represent programming received from a camera, network server and/or other source, as desired. Content may be stored in any media, including in memory, on a hard disk, on a networked server, and/or in any other digital, optical or other available storage medium. Content 105 may be stored in any sort of compressed or uncompressed format, as desired, and may be encoded or transcoded as desired for effective receipt, storage, retrieval and playing.

Some embodiments of system 100 may simply use host 116 to provide control of media server 104 for recording programs, to deleting stored content 105, changing settings or parameters, and/or performing any other desired tasks. Other embodiments, however, may allow for streaming or other playing of media content 105 from server 104 to client 102. To that end, various embodiments of media server 104 may incorporate placeshifting functionality to support viewing of content 105 over network 110 (e.g., by client 102). In some embodiments, media server 104 includes a separate placeshifting device that works in conjunction with a STB, receiver, DVR, media player or other device to shift the viewing experience from a home television to a viewing display that is accessed via network 110. Examples of placeshifting devices that may be used in some embodiments of media server 104 could include any of the various SLINGBOX products available from Sling Media of Foster City, Calif., although other products or servers 104 could be used in other embodiments. Many different types of placeshifting devices are generally capable of receiving media content from an external source, such as any sort of DVR or STB, cable or satellite programming source, DVD player, and/or the like. In other embodiments, placeshifting features are incorporated within the same device that provides content-receiving or other capabilities. Server 104 may be a hybrid DVR and/or receiver, for example, that also provides transcoding and placeshifting features. Examples of conventional placeshifting functions, features, systems and structures are described in United States Patent Publication No. 2006/0095471, although the features described herein could be equivalently applied with any number of other techniques and structures in addition to those described in that particular publication.

Host 116 is any server or other network host capable of interacting with one or more clients 102 to provide instructions to one or more servers 104. In various embodiments, host 116 is a program guide server that also allows integration of program guide information 115 and/or information about available on-demand programming 112 or the like with information about content 105, as described more fully below.

FIG. 1 shows one example of a host 116 that could be used to provide a guide server that interacts with any number of clients 102 and servers 104. To that end, each host 116 within system 100 may be implemented with a server computer system or service that is based upon any processor, architecture and/or operating system. Each host 116 will typically by implemented using any sort of conventional processing hardware 122, memory 124 and input/output features 125. Various embodiments may be implemented using dedicated or shared hardware servers; other implementations may make use of virtual server features as part of a "cloud computing" service, such as any of the cloud computing services provided by AMAZON, GOOGLE, MICROSOFT, IBM, UBUNTU, SUN MICROSYSTEMS and/or any number of other providers.

Although FIG. 1 shows a single host 116 for convenience, many practical embodiments may provide a cluster or other collection of multiple hosts 116 to support any desired number of simultaneous connections. This cluster may also incorporate appropriate routing, load balancing, access and security mechanisms and or any number of other features. In various embodiments, each host 116 is an actual or virtual computer system executing an operating system 126 such as any version of LINUX, UNIX, SOLARIS, NETWARE, WINDOWS, OS/X, AIX and/or the like. The various UNIX/LINUX operating systems typically provide a computing core that is capable of executing a guide server application 128, as well as any number of daemons, processes, applications or other instance modules as desired. For example, a guide server application 128 could execute as a daemon on host 116, with connections to separate clients 102 being managed as separate processes or instances that communicate with server application 128 using features provided by operating system 126.

Guide server application 128 is typically initiated when host 116 is booted or otherwise initialized. In various embodiments, application 128 suitably registers with any appropriate load balancers or other routers so that connections with clients 102 can be appropriately distributed. Application 128 then processes connection requests from clients 102 as appropriate. In the embodiment shown in FIG. 2, guide server application 128 contains control logic 132 for controlling remotely-located servers 104 and a web server or other presentation logic 136 for providing information to client 102 in a web-based or other format that can be conveniently presented to the user. Various embodiments may also provide search engine logic 134 as desired; this search engine may perform an integrated search of information about content 105 that is stored with the remote media server 104, as well as any program guide information 115 and/or information about on-demand programming 112 as desired. Such information 112, 115 may be obtained from any database or other source available to host 116, including any database executing on a separate server or the like.

Control module 132 contains any appropriate programming logic to establish sessions over network no with one or more media servers 104 in response to requests received from clients 102. Such sessions can be used to retrieve information from the media server 104 and/or to provide instructions to the media server as desired. As described below, sessions with media servers 104 may be initiated by through one or more message servers 114 that have pre-established connections with the particular message server 114 to be contacted.

Interactions between host 116 and client 102 may be managed in any manner. In various embodiments, client 102 interacts with host 116 using a conventional web browser 107 that can receive information from a conventional web server module 136 at host 116. Such information may be provide as part of dynamic or active web content (e.g., using ASP, JAVASCRIPT, Cold Fusion, PHP and/or other content, or using JAVA, ACTIVEX and/or other plugins), and/or as static content (e.g., using HTML, XML or similar constructs). In various embodiments, presentation module 136 provides a conventional web page or similar document with embedded active content that allows the user to interact with a program guide or other information using conventional graphical user interface (GUI) constructs. The web page(s) provided from presentation module 136 may also provide a media player application 107, or may simply accommodate and interact with a media player application 107 that resides on client 102.

Guide server application 128 may provide any alternate and/or additional functions and features as desired. Generally, guide server application 128 is at least partially implemented using conventional compiled object code derived from source code in any programming language (e.g., C, C++ or the like). Other embodiments may make use of an interpreted or other abstracted environment, such as the JAVA environment available from Sun Microsystems of Sunnyvale, Calif. or the .NET environment available from Microsoft Corporation of Redmond, Wash. Other embodiments may implement the various components of guide server application 128 using any other programs, programming languages, scripting languages, development or execution environments, and/or the like. Such programming may be stored in source or object code form on any digital storage medium (e.g., memory 124, mass storage, removable media, or any other medium) that is accessible to guide server application 128.

As noted above, directly connecting to a media server 104 from a network service 116 or client 102 may not always be convenient due to the presence of one or more firewalls or other security mechanisms within network 110, or any number of other factors. Various embodiments therefore provide any number of message servers 114 that are each capable of maintaining pre-existing connections with one or more network server 104. Each message server 114 is implemented using conventional computer server hardware, software and/or services, such as any of the hardware or software features described above in connection with host 116.

Message server 114 suitably receives requests for connections from one or more servers 104 to initiate persistent connections with the servers 104 in any manner. In various embodiments, server 104 maintains a relatively constant connection with a messaging server 114 at a uniform resource locator (URL) or other network address that can be readily contacted on network no. Messaging server 114 may simply be a TCP server, for example, that is automatically accessed when server 104 starts up, reboots, or otherwise initiates activity on network 110. In such cases, server 104 contacts the messaging server 114 (with the assistance of an appropriate routing or load balancing features), establishes a TCP or similar connection, and then awaits further action. This connection may be kept alive using relatively low bandwidth "keep alive" features that are part of the TCP protocol. By pre-establishing the connection from the server 104 to the messaging server 114, a pre-existing connection is maintained that can be used to send instructions or requests to the media server 104, even though the server is behind a firewall or other security mechanism. This is because many routers used in conventional firewalls will allow outgoing TCP connections that are originated within the trusted space while disallowing incoming TCP (and other) connections. After establishing a TCP or other connection from the server 104 to message server 114, that pre-existing connection can be used to transmit an instruction to server 104 to establish a separate session with the host 116. This second session can be established as another outgoing TCP (or other protocol) communication from media server 104 that is not likely to be blocked by the firewall. That is, message server 114 can transmit an instruction over the pre-existing channel that directs server 104 to separately contact host 116 and to establish an appropriate communications session between host 116 and media server 104. This instruction may optionally include information about the host 116 or other party that is requesting the connection, although this information need not be present in all embodiments. When instructed to do so, server 104 suitably establishes a TCP or other session with the host 116 that can be used to exchange data and instructions, or to perform other tasks as described more fully below.

Moreover, messages sent from message server 114 can be provided to the media server 104 on a relatively immediate basis in some embodiments. That is, if a server 116 wishes to contact a particular media server 104, the server 116 need not wait until the media server 104 polls the server 116, but rather can provide a message over network 110 in real-time, or near real-time. "Real time" in this context refers to a communication or other action that occurs in response to a stimulus (e.g., a user input, network request or the like) without substantial delay between the stimulus and the action. "Real time" communications, while typically occurring on a generally immediate basis, may nevertheless encounter and account for network and processing delays and other delays that are inherent in practical data communications systems.

System 100 therefore allows host 116 to establish a real-time session with server 104 in response to requests received from clients 102. The user of client 102 contacts host 116 by directing a browser 103 or similar program to a URL or other address associated with host 116. Upon receiving a request from client 102, host 116 suitably contacts the appropriate media server 104 via message server 114. In various embodiments, message server 114 transmits a message to the media server 104 over a pre-established connection that directs the media server 104 to contact host 116 to establish a communications session. After the communication session is established, host 116 can obtain information about programming 105 available to media server 104, and to provide any instructions to media server 104 as desired. In various embodiments, host 116 is able to interact with client 102 using web constructs or the like to provide searching of content, remote control of server 104, viewing of programming stored at server 104, and/or any other features as desired.

Figure 2:
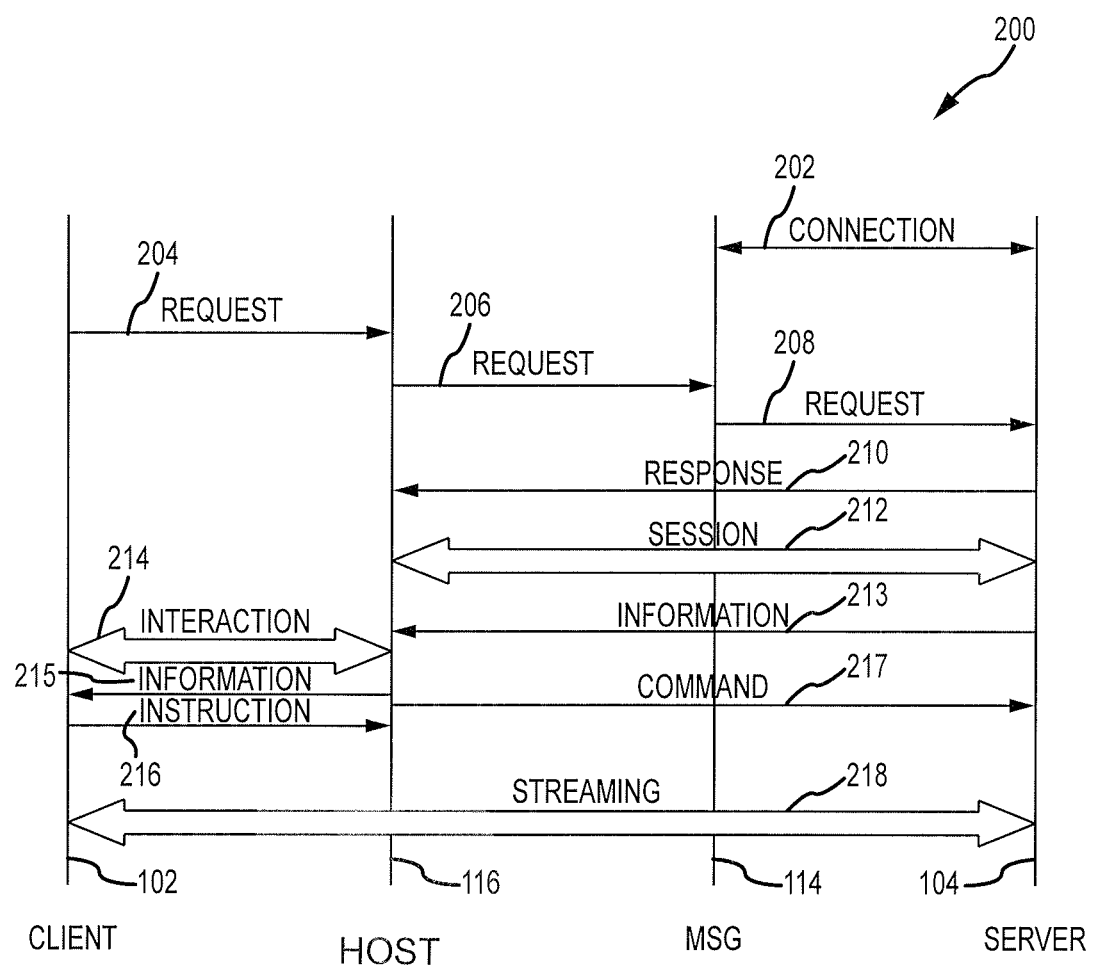

Turning now to FIG. 2, an exemplary process 200 for establishing a control session between a client 102 and a media server 104 using host 116 over network 110 is shown. Generally speaking, process 200 involves establishing a session 212 between host 106 and media server 104 in response to a request 204 received from a client 102. The session 212 can be used to obtain information 213 from the media server 104, to provide instructions 216 that control the operations of media server 104, and/or for any other purpose. Host 116 also interacts with client 102 as desired to provide information, to receive instructions, and/or for any other purpose. Further embodiments may also provide streaming 218 or other sharing of media content from media server 104 to client 102, as appropriate.

Typically, media server 104 initially contacts a message server 114 at startup or any other initializing state to establish a pre-existing connection 202. As noted above, media server 104 may initialize a connection 202 with a message server 114 at startup, in response to a prior connection being dropped or reset, in response to a hard or soft re-boot of the media server 104, and/or at any other appropriate time. The connection 202 then persists as the media server 104 remains connected to network 110 to allow for subsequent real-time communications. As noted above, connection 202 may be useful in circumventing a router or other security mechanism that may prevent conventional communications between host 116 and a media server 104 that may be located on a home, office, campus or other network.

Client 102 provides an initial request 204 for an interactive session in any manner. In various embodiments, a user of client 102 activates a web browser application 103, a standalone media application and/or the like and provides a known URL or other address that is associated with the host 106. The client application then formats a hypertext transport protocol (HTTP) or other query that can be transported across network 110 for receipt and processing by host 116. Other embodiments may use other protocols or formats other than HTTP or other conventional web formats. In some embodiments, request 204 (and/or other communications between client 102 and host 116) contains an identifier that can be used to authenticate the user and/or to determine a particular media server 104 to be contacted. This identifier may directly identify the media server 104 in some embodiments, although other embodiments may instead identify a user or user's account based upon userid/password combinations, digital signatures or other credentials. Media servers 104 associated with the identified user or user account may be selected, as desired, for further activity. To that end, host 116 may provide any sort of authentication of client 102 or its users in some embodiments, or any other mechanisms for selecting particular media servers 104 for further activity. Such authentication and selection may be provided using any number of messages or other interactions between host 116 and client 102, as appropriate. Host 116 may further interact with a security database, authentication server and/or any other resources to identify and authenticate the user, as desired.

Host 116 processes the received request 204 to establish a session 212 with the remotely-located media server 104. In the example process 200 shown in FIG. 2, host 116 suitably directs a message server 114 to contact the appropriate media server 104 using the pre-existing connection 202. To that end, host 116 provides a request 206 to the message server 114 or its associated load balancer, which appropriately forwards the request 206 to server 114 for further processing. Message server 114 then provides a request 208 to the media server 104 via the pre-existing connection 202 that directs the media server 104 to respond to the requesting host 116. The media server 104 appropriately responds 210 to the requesting host 116, and the media server 104 and host 116 then establish a session 212 with each other over network 110. Session 212 may be a conventional TCP session, for example, that allows for bi-directional data transfers in any convenient manner. Other embodiments may provide different types of sessions 212, including any sort of stateful or non-stateful bi-directional interchanges according to any protocols or other formats. In various embodiments, session 212 is a permanent or semi-permanent bi-directional interchange that is established in response to request 208 and that persists throughout the period of time that client 102 continues to provide instructions for control of media server 104. To that end, various embodiments may allow multiple commands, responses and/or other messages to be exchanged between host 116 and server 104 using a single, common session 212.

After session 212 is established between host 116 and the media server 104, information and commands may be exchanged in any manner. Media server 104 may provide information 213 about content 105 to host 116, for example, to allow for searching or other processing of the transferred information. In various embodiments, host 116 requests a listing of the media content 105 stored at the media server 104, as well as any metadata or other descriptive information (e.g., time of broadcast, program guide information, current preferences or other settings and/or the like) about the stored content 105 that may be available. Such information 213 may then be processed at host 116 and/or relayed to client 102, as desired.

Host 106 also interacts with client 102 to provide relevant information 215 and/or to obtain instructions 216 from the user as appropriate. To that end, information 213 may be filtered or otherwise processed at host 116 for delivery as information 215 and eventual display by client 102. In various embodiments, interaction 214 between client 102 and host 116 is implemented within the context of a conventional web session that allows active and/or passive web content to be displayed from presentation module 136 to browser 103; other embodiments may use different structures or techniques as desired.

The particular processing performed by host 106 may vary from embodiment to embodiment. In some implementations, a search engine 134 or other module is able to search and/or filter information 213 received from media server 104. Various embodiments may further obtain and process program guide information 115, information 112 about on-demand programming, and/or any other information as appropriate to provide a hybrid search feature. For example, some embodiments could allow a user to search for a particular program to obtain combined search results identifying the particular program in content 105 stored on the media server, in an upcoming broadcast, and/or in on-demand content. Hence, the flexibility and power of the search can be greatly enhanced by providing a combined search tool that accounts for different types of data, including information 213 obtained from the user's unique media server 104.

Other embodiments provide some or all of the information 213 about content 105 to client 102 to allow the client 102 to perform any desired actions. In various embodiments, client 102 provides instructions 216 to host 116 that identify desired actions to be performed by the remotely-located media server 104. Such actions may include, for example, recording a particular program, deleting a particular program, updating a setting or preference, controlling the playback of live or pre-recorded programming, and/or the like. Various embodiments may also facilitate streaming or other viewing of content 105 stored with media server 104 on client 102. In such embodiments, host 116 suitably receives the media stream 218 from media server 104 and relays the stream 218 to client 102. Other embodiments may provide streaming in any other manner.

Instructions 216 may be received at host 116 via interaction 214 in any manner. Commands 217 are then provided from host 116 to the remote server 104 via session 212 or the like to control the operation and/or media processing functions of media server 104. Various interactions between client 102, host 116 and media server 104 that make use of commands 217 are described below with respect to interfaces 300, 400 and 500. Generally speaking, the various tasks shown in connection with process 200 may be carried out with any sort of hardware, software and/or firmware logic within system 100. In various embodiments, the various steps of process 200 are carried out in response to software or firmware instructions stored in a memory, or on a disk drive and/or other storage associated with host 116, message server 114, client 102 and/or media server 104 as shown. Such instructions may be executed by any processor and/or other processing features within host 116, message server 114, media server 104, client 102 and/or the like as indicated in FIG. 2. The particular means used to implement each of the various functions shown in FIG. 2, then, could be any sort of processing hardware executing conventional software logic in any format that implements the various algorithms and techniques described herein. Each of the messages shown in FIG. 2 may be formatted using any conventional or proprietary formats compatible with network 110, such as any sort of TCP/IP compatible formats or protocols, although other protocols could be used in other embodiments.

Figure 3:
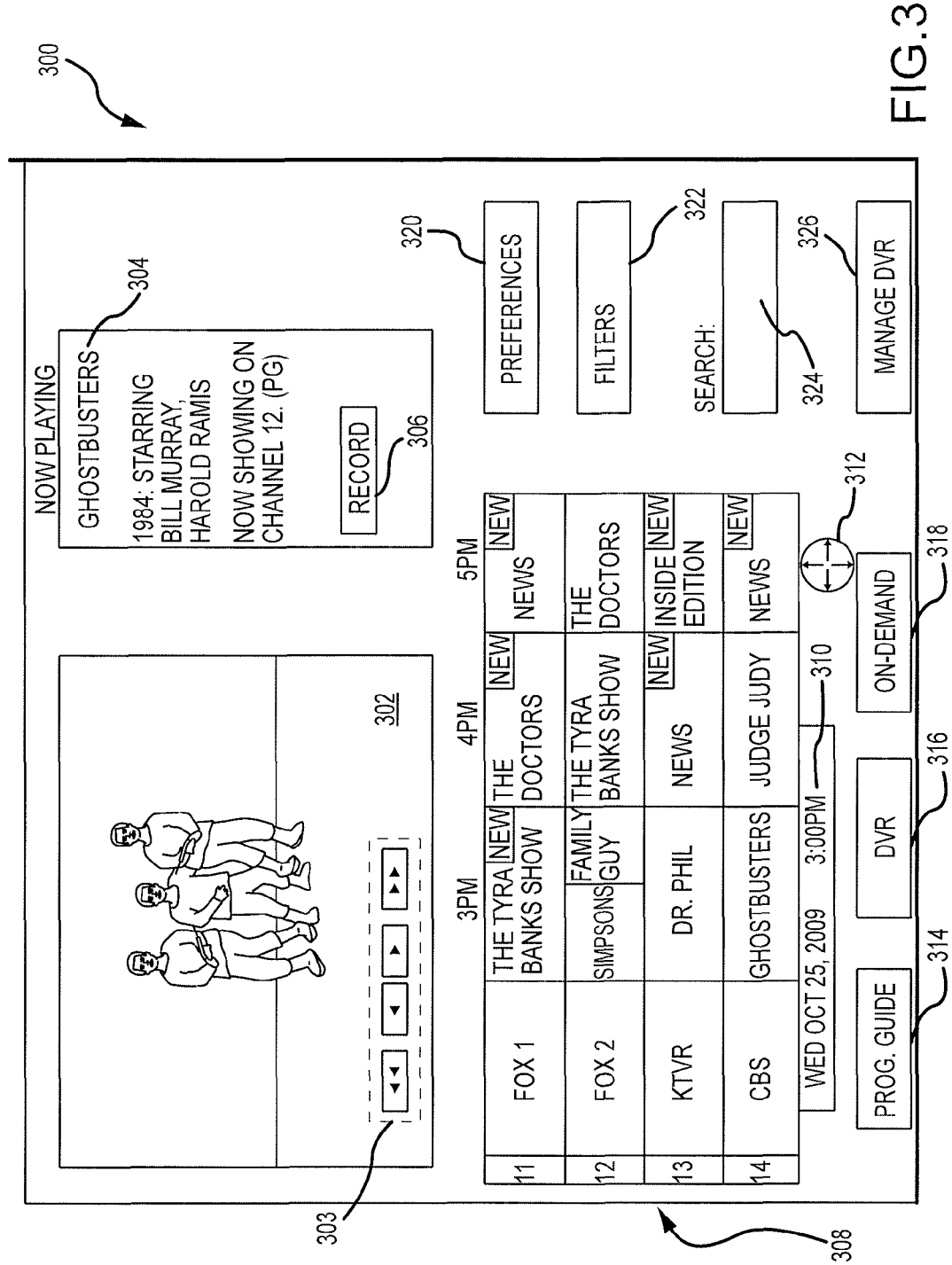
FIG. 3 shows one example of an interface with guide data and a media player that could be presented by a client in some embodiments.
Figure 4:
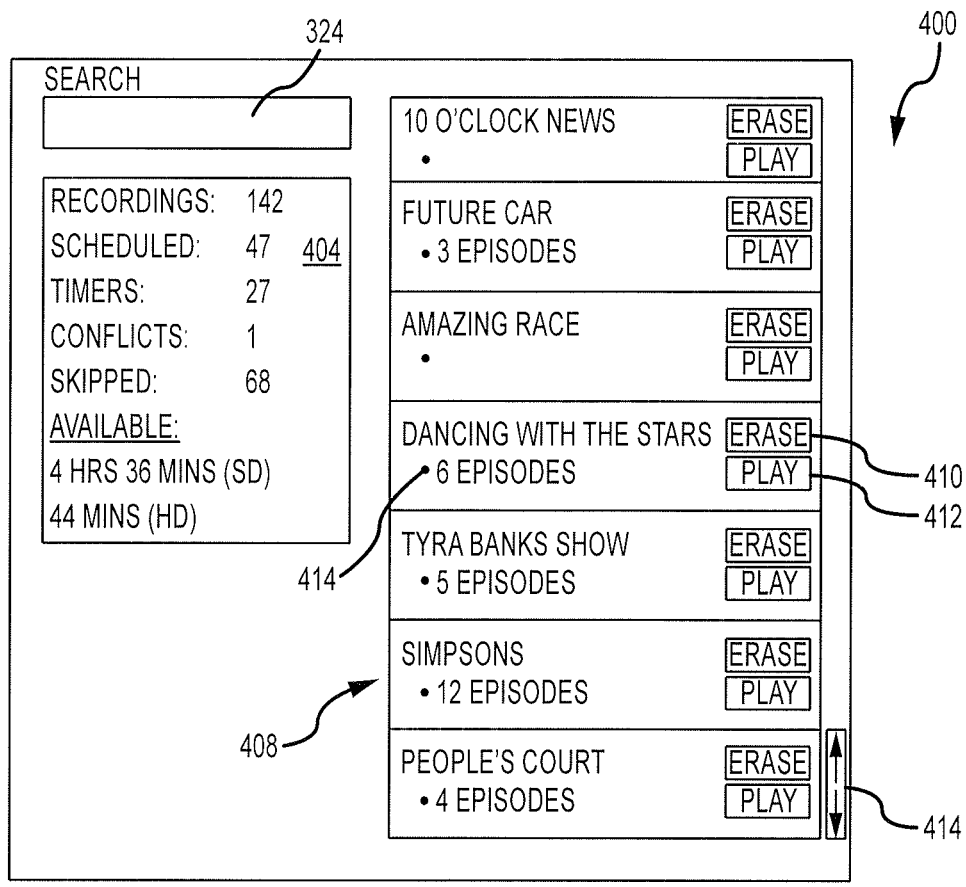
FIG. 4 shows one example of an interface that could be used to remotely manage programs stored on a DVR or other media server in some embodiments.
Figure 5:
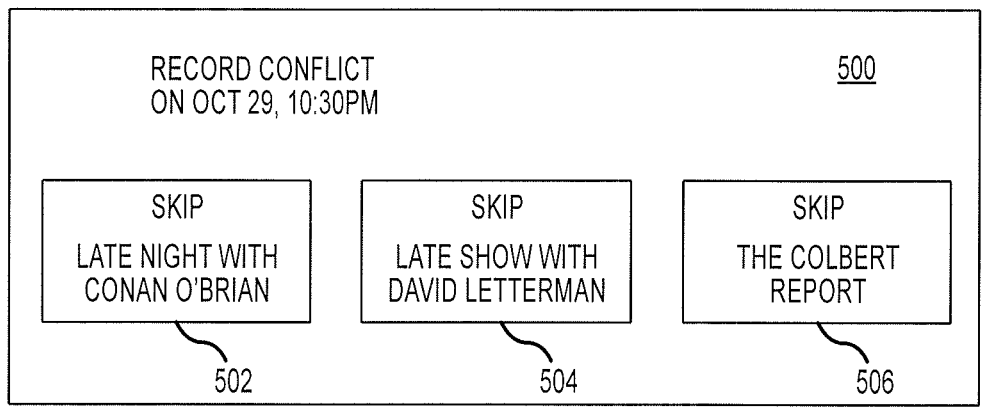
FIG. 5 shows one example of an interface window that could be used to resolve program recording conflicts in some embodiments.

FIGS. 3-5 show exemplary interfaces 300, 400 and 500 illustrating various features that may be provided in some embodiments. The actual features implemented may vary from embodiment to embodiment, however, and the graphical or other interface elements used to implement these features may similarly vary significantly. The graphical and spatial layout of the interfaces 300, 400 and 500, then, are purely exemplary. Each of the interfaces 300, 400, 500 may be generated in any manner. In various embodiments, some or all of interfaces 300, 400 and 500 are presented by browser 103 or another application on a suitable display that is associated with client 102. Such interfaces may include active and/or static content that is provided by presentation module 135 or the like.

FIG. 3 shows an exemplary interface 300 that may be used to provide guide information 115 to client 102, and to allow interactions with remote media server 104 based upon the guide information 115. As shown in FIG. 3, the exemplary interface 300 includes a media player 302, a guide window 308, a window 304 displaying information about the currently-viewed program, and/or any other interface features as desired.

Guide window 308 provides information about programming that is available from one or more sources. Such information may be obtained via interaction 214 with host 116, and may include program guide information 115 about upcoming broadcast programs, information about content 105 stored with media server 104, information 112 about on-demand programming, and any other information as desired. FIG. 3, for example, shows program guide information 115 for programming that can be received by an STB or other receiver associated with media server 104. In various embodiments, the viewer can simply select a currently-broadcast program to direct the remote server 104 to tune to the particular program and provide the program in a media stream 218 to client 102. In other embodiments, clicking on or otherwise selecting a program in window 308 could result in additional information about the program being displayed (e.g., in window 304), or any other actions as desired. The exemplary embodiment shown in FIG. 3 provides a "new" label on each of the programs that are believed to be first run (as opposed to re-runs) for viewer convenience. Other embodiments may not provide this feature, however, or the label may be activated/deactivated in response to a viewer preference, as appropriate.

Although the particular view of window 308 illustrated in FIG. 3 shows program guide information corresponding to a broadcast source, other views of window 308 may show information about stored programming 105 available to media server 104, on-demand content 112 available from a website or other source, and/or other content from any other source. Guide window 308 could equivalently display search results or any other listings of available programming, as desired. The different guide views may be selected using, for example, buttons 314, 316, 318 or the like. One or more scrolling buttons, sliders or other navigation features 312 may also be provided to allow viewing of additional information as desired.

In some implementations, information presented in window 308 may be selected and/or filtered in any manner. Filtering feature 322, for example, could allow a viewer to set a content filter that would prevent certain programming from being displayed in window 308 and/or viewed by media player 302. Filtering may be useful in establishing parental controls, for example, or other filters based upon content ratings, other guide data, or the like. Filters could be applied to block any programming that meets certain criteria (e.g., adult or violent content during certain hours). Other filters may be affirmatively applied such that only programming that meets certain criteria (e.g., only children's programming during certain hours) is displayed or viewed. Such filters may be established and/or modified using any sort of convenient interface. Further, filtering 322 may not be limited to viewing of programs on client 102; to the contrary, any filters established using client 102 may be provided to media server 104 via session 212 and applied across other displays, as desired.

Interface 300 could also be used to set or change any settings or other preferences 320 associated with client 102 or media server 104. Such settings may allow the viewer to select, for example, preferences for particular programming genres, sports, networks, channels, actors/actresses or other viewing choices. Such information may be used to optimize (or at least improve) search results, or for any other purpose. Preferences may be set using any interface feature 320 or the like.

As noted above, searching may be provided through a search feature 324 or the like. In such embodiments, the viewer enters a keyword, title or other search term. Client 102 suitably forwards the search terms to host 116 via interaction 214, and host 116 processes the search (e.g., using search engine 134) to identify available programming that meets the search criteria. In various embodiments, host 116 is able to search for programming from multiple sources so that a complete result can be provided to client 102. For example, if the viewer searches for a particular program, host 116 may be able to identify one or more episodes of the program in stored content 105, in upcoming broadcasts (as identified by program guide information 115), in on-demand programming, and/or in any other available sources. These results can be returned from host 116 to client 102 for display in window 308 or elsewhere to allow the viewer to take any desired action. If the program is identified in a future broadcast, for example, the viewer may opt to direct the media server 104 to record the upcoming showing. If the program is available in content 105 from media server 104 and/or any other on-demand source, then the viewer may select the program for immediate viewing. These results may be inter-combined in any manner. For example, a search result could indicate that certain episodes of a program are stored on media server 104, that other episodes are available from an on-demand source for free or fee-based viewing, and/or that other episodes will be available to media server 104 in an upcoming broadcast. Other embodiments may provide different results or features, as desired.

Media player window 302 may correspond to media player 107 described above. In such embodiments, media player 107 renders and presents a media stream to the viewer based upon selected content. Content may be selected from programs listed in window 308, if such programs are currently available from media server 104 or another source. As noted above, various embodiments allow the viewer to select programs from guide window 308. The client 102 then provides an instruction 216 to host 116 via session 212 to appropriately direct media server 104 to begin streaming the selected programming or to take any other appropriate action. Media player 302 may also provide navigation controls 303 to rewind, stop, play, fast forward or otherwise modify the playback of the media stream 218. User commands received with respect to navigation controls 303 may be similarly relayed to media server 104 via host 116 and session 212, as appropriate.

Window 304, as shown in FIG. 3, presents information about the currently-selected content. The currently-selected program may correspond to content currently viewed in media player window 302, if the selected program is immediately available. Alternately, the currently-selected program could correspond to an upcoming program shown in a program guide, an on-demand program, or any other content within window 308 or elsewhere. In the example shown in FIG. 3, the currently-selected program is currently received at media server 104 and streamed to client 102 for immediate viewing. If the viewer wanted to record the program, a record button 306 is provided that would allow an instruction 216 to be sent to host 116, which in turn would direct media server 104 to record the program. Upcoming programs could be similarly recorded by simply selecting the upcoming program in a guide window 308, search result or the like, and then activating a record button 306 or other record feature within interface 300. Because such directions 217 could be provided to media server 104 in real-time across the current session 212, recording could be initiated on a relatively immediate basis in some embodiments.

FIG. 4 shows an exemplary interface 400 that could be used in some implementations to manage the content 105 stored with media server 104. Interface 400, as illustrated in FIG. 4, includes a listing 408 of programming content 105 stored on media server 104, as well as an information window 404 that provides a current status of a disk, solid state drive and/or other data storage medium associated with media server 104. In the particular example shown in FIG. 4, programs are grouped by program title, with the number of available episodes 414 indicated as well. Other embodiments may organize and present programming listing 408 in any desired manner. A search feature 324 as described above may also be provided, as may any number of other additional or alternate features.

Interface 400 allows the viewer to manage the contents of the DVR or other repository of content 105 from client 102. Particular programs may be played from server 104, for example, by selecting a "play" feature 412 in interface 400. Selecting such a feature would result in an instruction 216 being sent to host 116, which in turn would send an appropriate message 217 via session 212 to direct the remote media server 104 to begin streaming the selected program. Messages 217 could also be generated using "erase" features 410, which would result in an instruction 216 to be provided to host 116, which in turn would direct media server 104 to erase the indicated program. Media server 104 may then provide updated information 213 in some embodiments so that listing 408 and information 404 remain accurate. Still other instructions 216 may be used, in some embodiments, to control the operation of media server 104. A mobile phone, computer or network-enabled remote control, for example, could interact with host 116 to select programming, to play, pause, record, forward/rewind or to perform other control functions as desired. Other features and functions may be provided in any number of alternate embodiments.

FIG. 5 shows an exemplary interface 500 that allows a user to select from conflicting recordings. In various embodiments, the media server 104 may be able to record only a limited number of simultaneous programs. Many conventional STBs, for example, may have tuner capabilities to receive and record two simultaneous programs, but not a third. Hence, if an instruction is received to record a third program, the viewer may be requested to select which program would not be recorded. Interface 500 shows one example of a window that could be provided that would allow the viewer to select which of program would not be recorded by activating an appropriate feature 502, 504, 506 that corresponds to the program to be skipped. Identification of recording conflicts could occur in any manner. In various embodiments, media server 104 provides a listing of currently-planned recordings as part of information 213. Such information may be provided in response to a request by host 116, or may be automatically provided as desired. In such embodiments, host 116 identifies when conflicting recordings are requested in instructions 216 from client 102, and provides interface 500 or the like in response. In other embodiments, interface 500 is generated in response to a message from media server 104 indicating that a recording conflict exists, and providing sufficient information for the viewer to resolve the conflict. Other processes and techniques may be formulated in any number of alternate embodiments.

FIGS. 1-5 therefore illustrate at least one example of a system 100 that could be used to remotely control a DVR, STB or other receiver, placeshifting device, file server or other media server 104 via a network 110. In some embodiments, the media server 104 is contacted using a persistent connection that the media server 104 previously established with a messaging server 114 to create a network session 212 with host 116; because this session allows for real-time (or near real-time) interaction between the host 116 and server 104, any number of commands 217 can be provided from host 116 to be executed on media server 104. Such commands 217 can be provided in response to user inputs at a client 102 using, for example, conventional active or static interface techniques implemented within a web browser 103 or the like. Various embodiments could use commands 217 to direct the recording, erasing, playing or other processing of programming content 105 stored at the media server 104. Other embodiments may use commands 217 to update settings or preferences, to control the operation of media server 104, and/or to take any other actions as desired.

While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of elements described without departing from the scope of the claims and their legal equivalents. The term "exemplary" is used herein to represent one example, instance or illustration that may have any number of alternates. Any implementation described herein as "exemplary" is not necessarily to be construed as preferred or advantageous over other implementations.

What is claimed is:

1. A method executable by a host communicating via a network with a client and with a media server that is configured to process media content, the method comprising:

receiving a first message from the client at the host via the network;

in response to the first message, establishing a session between the host and the media server via the network, wherein the session is initiated by the host contacting the media server via a message server that maintains a persistent connection to the media server that was previously established prior to the host receiving the first message from the client, and wherein the media server responds to a message received from the message server via the previously-established persistent connection by establishing the session as an outgoing connection from the media server to the host;

receiving information from the media server via the session, wherein the information describes media content processed at the media server;

providing the information about the media content processed at the media server from the host to the client via the network;

receiving an instruction from the client at the host to control the media server; and directing the media server from the host to execute the instruction received from the client via the session established as an outgoing connection from the media server to the host.

2. The method of claim 1 wherein the media server comprises a digital video recorder, and wherein the instruction directs the digital video recorder to record a program.

3. The method of claim 1 wherein the media server comprises a digital video recorder and wherein the instruction directs the digital video recorder to delete a program from the digital video recorder.

4. The method of claim 1 further comprising providing program guide information from the host to the client via the network, wherein the program guide information describes programming content available to the media server.

5. The method of claim 4 wherein the media server comprises a digital video recorder, and wherein the instruction to change the media content comprises an instruction to record a program identified in the program guide information using a digital video recorder.

6. The method of claim 1 wherein the establishing comprises the host initially transmitting a request to the message server having the persistent connection previously established via the network with the media server, and wherein the request sent from the host to the message server initiates a message from the message server to the media server via the persistent connection.

7. The method of claim 1 wherein the session established as an outgoing connection from the media server to the host is a real-time communications session.

8. The method of claim 1 wherein the providing comprises the host forming a web page with the information and transmitting the web page to an application executing on the client.

9. The method of claim 8 wherein the web page is formed to accommodate a media player application.

10. The method of claim 9 further comprising directing the media server to provide at least some of the media content stored on the media server to the media player application.

11. A system that communicates via a network with a client and with a media server that is configured to process media content, the system comprising:

a message server configured to communicate with the media server via the network using a pre-existing persistent connection that was established as an outgoing connection from the media server to the message server; and a guide server that is separate from the message server, wherein the guide server is configured to receive a request for a connection to the media server from the client via the network, to direct the message server to contact the media server via the pre-existing persistent connection in response to the request so that the media server is directed to establish an outgoing session from the media server to the guide server via the network, to receive information about the media content via the session, to provide the information about the media content to the client, to receive an instruction from the client to control the media server, and, in response to the instruction received from the client, to direct the media server via the session to execute the instruction, wherein the media server establishes the pre-existing persistent connection to the message server before the guide server receives the request from the client and wherein the outgoing session from the media server to the guide server is established in response to the request received from the client.

12. The system of claim 11 wherein the outgoing session is a real-time communications session.

13. The system of claim 11 wherein the guide server comprises a web server configured to provide the information about the media content stored at the media server in a web-compatible format.

14. The system of claim 11 further comprising a first database comprising program guide information, wherein the guide server is configured to receive the program guide information from the first database and to provide the program guide information to the client via the network, and wherein the instruction comprises an instruction to record a program identified in the program guide information that is provided to the client.

15. The system of claim 14 wherein the guide server is further configured to receive an instruction from the client to search for a particular program, to search for the particular program in both the information about the media content stored at the media server and the program guide information, and to provide a combined search result to the client.

16. The system of claim 14 wherein the media server is a placeshifting device, wherein the content stored at the media server comprises programs recorded by a user, and wherein the instruction is an instruction to record one of the programs recorded by the user that is provided in response to an input provided to the client by the user.

17. The system of claim 16 wherein the media server is further configured to authenticate the user prior to establishing the session with the media server.

18. A method executable by a host communicating via a network with a client and with a media recorder having stored media content, wherein the media recorder is separated from the client and the host by a firewall, the method comprising:

receiving a first message from the client at the host via the network, wherein the first message identifies the media recorder;

in response to the first message, transmitting a second message from the host to a message server having a pre-existing connection with the identified media recorder via the network, the pre-existing connection being established as an outgoing connection through the firewall from the identified media recorder to the message server before the host receives the first message from the client that persists over time, the second message initiating an instruction to the media recorder to establish a session with the host via the network, wherein the session is established as an outgoing session from the media recorder to the host through the firewall;

providing program guide information from the host to the client via the network;

receiving an instruction to record a program identified in the program guide information from the client at the host; and in response to receiving the instruction at the host, directing the media recorder to record the identified program via the session established from the media recorder to the host through the firewall.

19. The method of claim 18 wherein the session is a real-time communications session, and wherein the method comprises receiving a list of currently-planned recordings from the media recorder via the real-time communications session.

20. The method of claim 19 further comprising identifying a conflict between the instruction received from the client and the list of currently-planned recordings and, if the conflict exists, receiving a second instruction from the client that resolves the conflict and directing the media recorder via the real-time communications session to resolve the conflict in accordance with the second instruction.

* * * * *